United States Patent
Nakane et al.

(10) Patent No.: US 6,868,334 B2
(45) Date of Patent: Mar. 15, 2005

(54) MAP DATA PROVIDING APPARATUS, MAP DATA INSTALLING TERMINAL DEVICE, AND COMMUNICATION-TYPE NAVIGATION APPARATUS

(75) Inventors: Yuusuke Nakane, Tokyo-to (JP);
Motohiko Takayanagi, Tokyo-to (JP);
Toyohiro Takenaka, Kawagoe (JP);
Atsuhiko Fukushima, Kawagoe (JP);
Toru Fujita, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 49 days.

(21) Appl. No.: 10/212,462

(22) Filed: Aug. 6, 2002

(65) Prior Publication Data

US 2003/0036845 A1 Feb. 20, 2003

(30) Foreign Application Priority Data

Aug. 10, 2001 (JP) ...................... 2001-243239
Aug. 10, 2001 (JP) ...................... 2001-243246
Aug. 10, 2001 (JP) ...................... 2001-243251

(51) Int. Cl.$^7$ ............................................. G01C 21/00
(52) U.S. Cl. ...................... 701/208; 701/200; 701/214; 340/989; 340/990; 342/450; 342/451
(58) Field of Search ................................ 701/200, 207, 701/208, 210, 212, 214; 340/988, 989, 990, 995; 342/357, 450, 451

(56) References Cited

U.S. PATENT DOCUMENTS

| | | | |
|---|---|---|---|
| 5,911,774 A | * | 6/1999 | Itoh .............................. 701/207 |
| 6,023,654 A | * | 2/2000 | Mohlenkamp ............... 701/208 |
| 6,052,645 A | | 4/2000 | Harada ......................... 701/212 |
| 6,246,958 B1 | | 6/2001 | Hirono ......................... 701/208 |
| 6,324,469 B1 | * | 11/2001 | Okude et al. ................ 701/208 |
| 6,600,993 B1 | * | 7/2003 | Kaneko et al. .............. 701/208 |

FOREIGN PATENT DOCUMENTS

| | | |
|---|---|---|
| JP | 07 262493 | 10/1995 |
| JP | 7-262495 | 10/1995 |
| JP | 10-96644 | 4/1998 |

\* cited by examiner

Primary Examiner—Thomas G. Black
Assistant Examiner—Arthur D. Donnelly
(74) Attorney, Agent, or Firm—Morgan, Lewis & Bockius LLP

(57) ABSTRACT

A certain amount of basic map data is installed into the map data storage medium in the navigation apparatus at the time of initial setting or the like (this process will be hereinafter referred to as "pre-install"), and thereafter the user connect to the map data providing center to download necessary data according to need. Thus, the present invention offers efficient method of obtaining map data in the communication-type navigation system.

45 Claims, 15 Drawing Sheets

MAP DATA PROVIDING APPARATUS, MAP DATA INSTALLING TERMINAL DEVICE, AND COMMUNICATION-TYPE NAVIGATION APPARATUS

BACKGROUND OF THE INVENTION

1. Field of the Invention

This invention belongs to a technical field of a communication-type navigation apparatus, and more particularly to a pre-install processing of map data executed at the time of initial setting of the navigation apparatus.

2. Description of Related Art

A known navigation apparatus utilizes map data stored in a map data storage medium such as a CD-ROM (Compact Disc-Read Only Memory) or a DVD-ROM (DVD-Read Only Memory). Namely, the navigation apparatus includes a drive unit for the map data storage medium such as a CD-ROM or a DVD-ROM, and reads out map data around the current position of the vehicle according to the movement of the vehicle to display the map data on a LCD (Liquid Crystal Display) or the like attached on the vehicle near a driving seat of the vehicle.

However, in the case of using such a storage medium as a data supply source of map data, there is a problem that frequently updating the map data is difficult. The map data is updated in accordance with the expansion road network. Also, the map data used by the navigation apparatus includes, in addition to road data, information such as neighboring facilities and/or shops (e.g., road-side shops, gas stations and soon). Recently, shops open and shut up relatively frequently. A user who always needs new information should frequently buys and changes the map data storage medium, and this is burdensome for the user. In addition, a new edition of map data storage medium is put into the market every certain time period, e.g., every 6 months or every year, and hence the user cannot catch up with the on-going real change of the shops or stores even if he or she buys a new edition every time.

Moreover, recently functions of the navigation apparatus are being improved and sophisticated, and the map data includes more auxiliary data, other than the road data. Hence, the navigation apparatus needs to employ a microprocessor having high-speed processing capability to enable sophisticated route search and/or route guidance. This increases the size and the cost of the navigation apparatus.

In order to overcome the above-mentioned problems, recently a communication-type navigation system has been proposed. In such a communication-type navigation system, a navigation apparatus installed on a vehicle and a map data providing center on a communication network communicate with each other by wireless communication, and map data is downloaded from the map data providing center to the navigation apparatus on the vehicle. The navigation apparatus stores the downloaded map data on an internal storage medium such as a hard disk, and performs map display and/or route guidance by using the stored map data. Examples of such a communication-type navigation apparatus are disclosed in Japanese Patent Applications Laid-Open under No. 7-262495 and No. 10-96644.

In such a communication-type navigation system, by updating the map database on the map data providing center side, a user can always obtain and use newest map data by communication with the map data providing center.

However, connecting the map data providing center to download map data requires communication cost that is charged to the user. Therefore, the user should pay a large amount of communication fee if he or she downloads all of the necessary map data by the communication with the map data providing center.

SUMMARY OF THE INVENTION

It is an object of the present invention to provide a user with a way to efficiently obtain map data of necessary range and install the map data into a communication-type navigation apparatus.

According to one aspect of the present invention, there is provided a map data providing apparatus connected with a map data install terminal for a communication-type navigation apparatus via a communication device, including: a receiving unit which receives a reference point data indicating a reference point from the map data install terminal; a map data obtaining unit which obtains map data corresponding to a predetermined number of meshes including no unnecessary mesh based on the reference point data; and a transmitting unit which transmits the obtained map data to the map data install terminal.

The above map data providing apparatus is configured to be able to communicate with a map data install terminal installed in a shop or the like. The user of the communication-type navigation apparatus visits the shop and have the map data pre-installed in the navigation apparatus. When the map data install terminal transmits the reference point data, a predetermined number of meshes including no unnecessary mesh are determined based on the reference point. The map data corresponding to those meshes are obtained and transmitted to the map data install terminal via a communication path. In the shop, the map data transmitted from the map data providing apparatus is installed into the communication-type navigation apparatus.

The map data obtaining unit may include: a selecting unit which selects the predetermined number of meshes based on the reference point data; and a replacing unit which detects the unnecessary meshes included in the predetermined number of meshes selected by the selecting unit and replaces the detected meshes with other meshes. According to this feature, first a predetermined number of meshes are selected based on the reference point data, and then it is determined whether or not those meshes include an unnecessary mesh. If one or more unnecessary meshes are detected, they are replaced with other meshes. As a result, the map data of the predetermined number of meshes, that include no unnecessary mesh, are provided to the map data install terminal.

According to another aspect of the present invention, there is provided a map data providing apparatus connected with a map data install terminal for a communication-type navigation apparatus via a communication device, including: a receiving unit which receives a reference point data indicating a reference point from the map data install terminal; a map data obtaining unit which obtains map data, that corresponding to a plurality of meshes including no unnecessary mesh and having data amount no more than a predetermined pre-install data amount, based on the reference point data; and a transmitting unit which transmits the obtained map data to the map data install terminal.

The above map data providing apparatus is configured to be able to communicate with a map data install terminal installed in a shop or the like. The user of the communication-type navigation apparatus visits the shop and have the map data pre-installed in the navigation apparatus. When the map data install terminal transmits the reference point data, a plurality of meshes including no unnecessary mesh are determined, based on the reference point, within the range of the pre-install data amount. The map data corresponding to those meshes are obtained and transmitted to the map data install terminal via a communication path. In the shop, the map data transmitted from the map data providing apparatus is installed into the communication-type navigation apparatus.

The map data obtaining unit may include: a selecting unit which selects the plurality of meshes based on the reference point data; and a replacing unit which detects the unnecessary meshes included in the plurality of meshes selected by the selecting unit and replaces the detected meshes with other meshes. According to this feature, first a plurality of meshes are selected based on the reference point data, and then it is determined whether or not those meshes include an unnecessary mesh. If one or more unnecessary meshes are detected, they are replaced with other meshes. As a result, the map data of the meshes, that include no unnecessary mesh, are provided to the map data install terminal.

The map data obtaining unit may include: a selecting unit which selects one mesh based on the reference point data; a memorizing unit which determines whether or not the one mesh is an unnecessary mesh and memorizes the mesh other than unnecessary mesh; and a unit which controls the selecting unit to perform selection and controls the memorizing unit to perform determination until a number of the memorized mesh reaches the predetermined number, or until the total data amount of the map data corresponding to the memorized meshes reaches the pre-install data amount.

According to this feature, the mesh is selected one by one based on the reference point, and it is determined whether or not the mesh is unnecessary mesh. If it is not an unnecessary mesh, the mesh is used as valid. If it is an unnecessary mesh, the mesh is not used, and next mesh is obtained. Thus, the selection and determination are repeated until a predetermined number of meshes including no unnecessary mesh are obtained, or a plurality of meshes including no unnecessary mesh are obtained within the pre-install data amount. As a result, the map data corresponding to the meshes including no unnecessary mesh are provided to the map data install terminal.

The predetermined number may be determined based on a storage capacity of a pre-install data storage unit of the communication-type navigation apparatus. By this, the map data can be provided for a range as broad as possible, within the storage capacity of the map data storage unit of the communication-type navigation apparatus.

The predetermined number may be a number of the meshes belonging to an area within a predetermined distance from the reference point. By this, only effective map data within the range determined, in advance, from the reference point are provided.

The replacing unit replaces the detected unnecessary mesh with another mesh located opposite, with respect to the reference point, to the detected unnecessary mesh. According to this feature, when the unnecessary mesh is detected, it is relatively likely that unnecessary meshes exist around the detected unnecessary mesh. Therefore, the detected unnecessary mesh is replaced with another mesh located opposite to that unnecessary mesh.

The replacing unit replaces the detected unnecessary mesh with another mesh located adjacently to the mesh already selected by the selecting unit. According to this feature, the new mesh for the replacement is located adjacent to the mesh already selected, and hence the map data of meshes successive in up-down or left-right direction can be obtained.

The replacing unit may replaces the another mesh with still another mesh if the another mesh is an unnecessary mesh. Thus, the replacement is repeated unit no unnecessary mesh is included in the selected meshes, and hence only the effective map data is provided to the map data install terminal.

The selecting unit may select the mesh one after another in one of a clockwise direction and a counterclockwise direction with the reference point regarded as a center. By this, successive data from with the reference point serving as a center is obtained.

The map data corresponding to each mesh may have a data structure including road data and auxiliary data, and the unnecessary mesh may be a mesh which does not include road data. By this, the unnecessary mesh can be readily detected by judging the contents of the map data.

The unnecessary mesh may correspond to a geographical area completely belonging to a mountain area or a water area. In this case, if the navigation apparatus is for vehicle, the map data of the area in which the vehicle does not enter can be eliminated.

The unnecessary mesh may correspond to a mesh for which no substantial data associated with map is prepared. By this, if substantial data such as road data is not prepared for a certain map data for the area such as mountains or water area, the map data of such areas are eliminated.

According to still another aspect of the present invention, there is provided a map data providing apparatus connected with a map data install terminal for a communication-type navigation apparatus via a communication device, including: a receiving unit which receives a reference point data indicating a reference point from the map data install terminal; an area determining unit which determines a pre-install area based on the reference point data; a map data obtaining unit which obtains map data corresponding to the pre-install area; and a transmitting unit which transmits the obtained map data to the map data install terminal, wherein, when the receiving unit receives a plurality of reference points, the map data obtaining unit determines the pre-install area based on a plurality of reference points.

The above map data providing apparatus is configured to be able to communicate with a map data install terminal installed in a shop or the like. The user of the communication-type navigation apparatus visits the shop and have the map data pre-installed in the navigation apparatus. When the map data install terminal transmits the reference point data, the map data providing apparatus determines the pre-install area based on the reference point. The pre-install area is an area for which the map data is installed to the communication-type navigation apparatus by pre-install process. If the user designates a plurality of reference points, the pre-install area is determined based on those plural reference points. When the pre-install area is determined, the corresponding map data is obtained from a map database or the like, and transmitted to the pre-install terminal. In the shop, the map data obtained from the map data providing apparatus is installed into the communication-type navigation apparatus.

The area determining unit may determine a continuous area of a predetermined range which covers all of the plurality of reference points as the pre-install area. Thus, a continuous map data including the area around the reference point designated by the user and the area between the plural reference points are pre-installed.

The area determining unit may determine an aggregation of a plurality of separate predetermined ranges, each including the reference point at its center, as the pre-install area. Thus, the map data of the areas around the respective reference points designated by the user are pre-installed.

The predetermined range may have a circular or a rectangular shape. Thus, the map data around the reference point can be evenly pre-installed.

When the receiving unit receives no less than two reference points, the area determining unit may determine the pre-install area to include an area defined inside of a polygon formed by connecting the plurality of reference points. By this, the map data inside of the polygon formed by connecting the plural reference points can be pre-installed.

The area determining unit may determine the pre-install area to include a connecting area defined along neighboring two of the reference points and having a predetermined width. According to this feature, since the map data is pre-installed along the line connecting the neighboring reference points, the user can automatically pre-install the map data of the area where he or she passes at the time of moving the designated reference points.

The receiving unit may receive a direction data associated with the reference point, and the area determining unit may determine the pre-install area to include an area of a predetermined range defined in a direction indicated by the direction data. According to this feature, when the user designates the reference point and the direction, the map data in a range from the designated reference point in the designated direction is pre-installed.

The area determining unit may determine the pre-install area to include an area of a predetermined range along a main road which passes near the reference points. Thus, the map data along a main road passing near the reference point can be automatically pre-installed.

The area determining unit may include: a selecting unit which selects meshes constituting the map data; and a unit which stops selection of the meshes by the selecting unit when a number of the selected meshes reaches a predetermined number and which determines the pre-install area in accordance with the meshes that has been selected at that time. By this, the pre-install area can be efficiently determined in a range of a predetermined number of meshes determined in advance.

The area determining unit may include: a selecting unit which selects meshes constituting the map data; and a unit which stops selection of the meshes by the selecting unit when a total data amount of the selected meshes reaches a predetermined data amount and which determines the pre-install area in accordance with the meshes that has been selected at that time. By this, the pre-install area can be efficiently determined in a predetermined data amount determined in advance.

According to still another aspect of the present invention, there is provided a map data install terminal which communicates with the map data providing apparatus described above, including: transmitting unit which transmits the reference point data to the map data providing apparatus; and a unit which stores the map data received from the map data providing apparatus into a storage medium that can be installed to a navigation apparatus.

In accordance with the map data install terminal, the reference point data is transmitted to the map data providing apparatus, and the map data corresponding to the pre-install area, determined based on the reference point, can be obtained in a form of a storage medium. BY inserting or attaching the storage medium carrying the map data to the communication-type navigation apparatus, the map data of the pre-install area can be pre-installed.

According to still another aspect of the present invention, there is provided a map data install terminal which communicates with the map data providing apparatus described above, including: a unit which transmits the reference point data to the map data providing apparatus; and a unit which stores the map data received from the map data providing apparatus to a navigation apparatus via a communication path.

In accordance with the map data install terminal, the reference point data is transmitted to the map data providing apparatus, and the map data corresponding to the pre-install area, determined based on the reference point, is received. The map data thus received can be installed into the communication-type navigation apparatus by data communication.

According to still another aspect of the present invention, there is provided a communication-type navigation apparatus including: a data storage unit which stores map data; a storing unit which stores the map data provided from a map data providing apparatus described above into the data storage unit as pre-install map data; and a unit which communicates with the map data providing apparatus to obtain map data and stores the map data into the data storage unit.

In accordance with the communication-type navigation apparatus, the map data provided by the map data providing apparatus is stored in the data storage unit as the pre-install map data. The map data obtained via the data communication during the movement of the mobile body is stored in the data storage unit one after another. The map data of a certain range is pre-installed at the time of the initial setting, and thereafter the map data is obtained as necessary. Therefore, the communication cost may be reduced and the map data can be efficiently obtained.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

In a communication-type navigation apparatus, map data is basically downloaded by data communication. However, at the time of initial setting or the like, relatively large amount of map data should be prepared and installed into the navigation apparatus. If all of the map data is downloaded by data communication at the time of initial setting, the user's burden of the communication cost increases a lot. In this view, according to the present invention, a certain amount of basic map data is installed into the map data storage medium in the navigation apparatus at the time of initial setting or the like (this process will be hereinafter referred to as "pre-install"), and thereafter the user connect to the map data providing center to download necessary data according to need. Thus, the present invention offers efficient method of obtaining map data in the communication-type navigation system.

The preferred embodiments of the present invention will now be described below with reference to the attached drawings.

[Navigation Apparatus]

Figure 1:
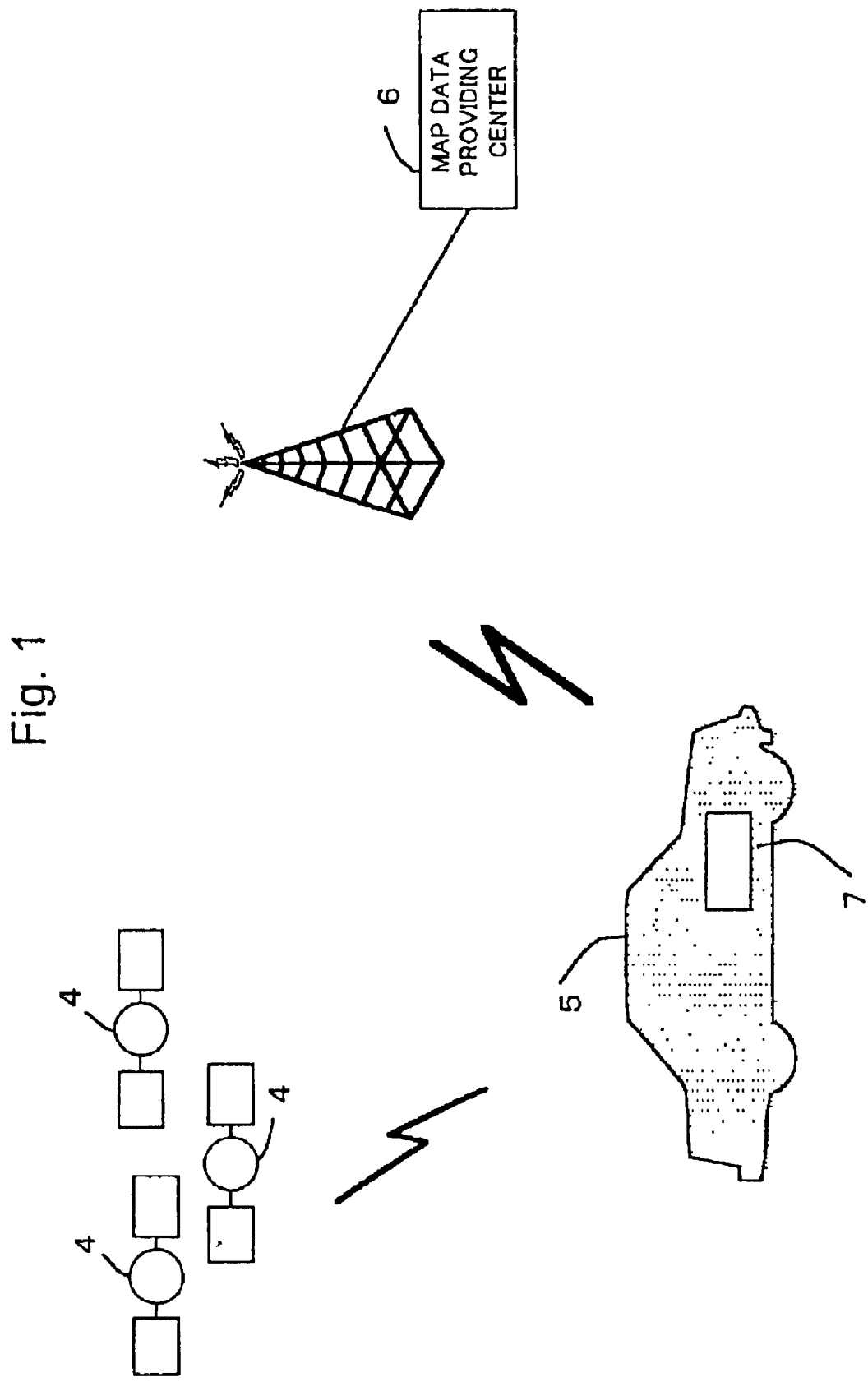
FIG. 1 is a diagram schematically showing a situation where a communication-type navigation apparatus is used.

FIG. 1 schematically illustrates a situation in which the navigation apparatus according to the present invention is used. In FIG. 1, the navigation apparatus 7 is installed on the vehicle 5. The navigation apparatus 7 receives radio waves from the plural satellites 4 to measure the position of the vehicle. Also, the navigation apparatus 7 connects to the map data providing center 6 by the communication function to download the map data and stores it in the map data storage unit in the navigation apparatus 7. According to the movement of the vehicle, the navigation apparatus 7 obtains necessary map data from the map data providing center 6 to execute function such as route search and/or route guidance.

Figure 2:
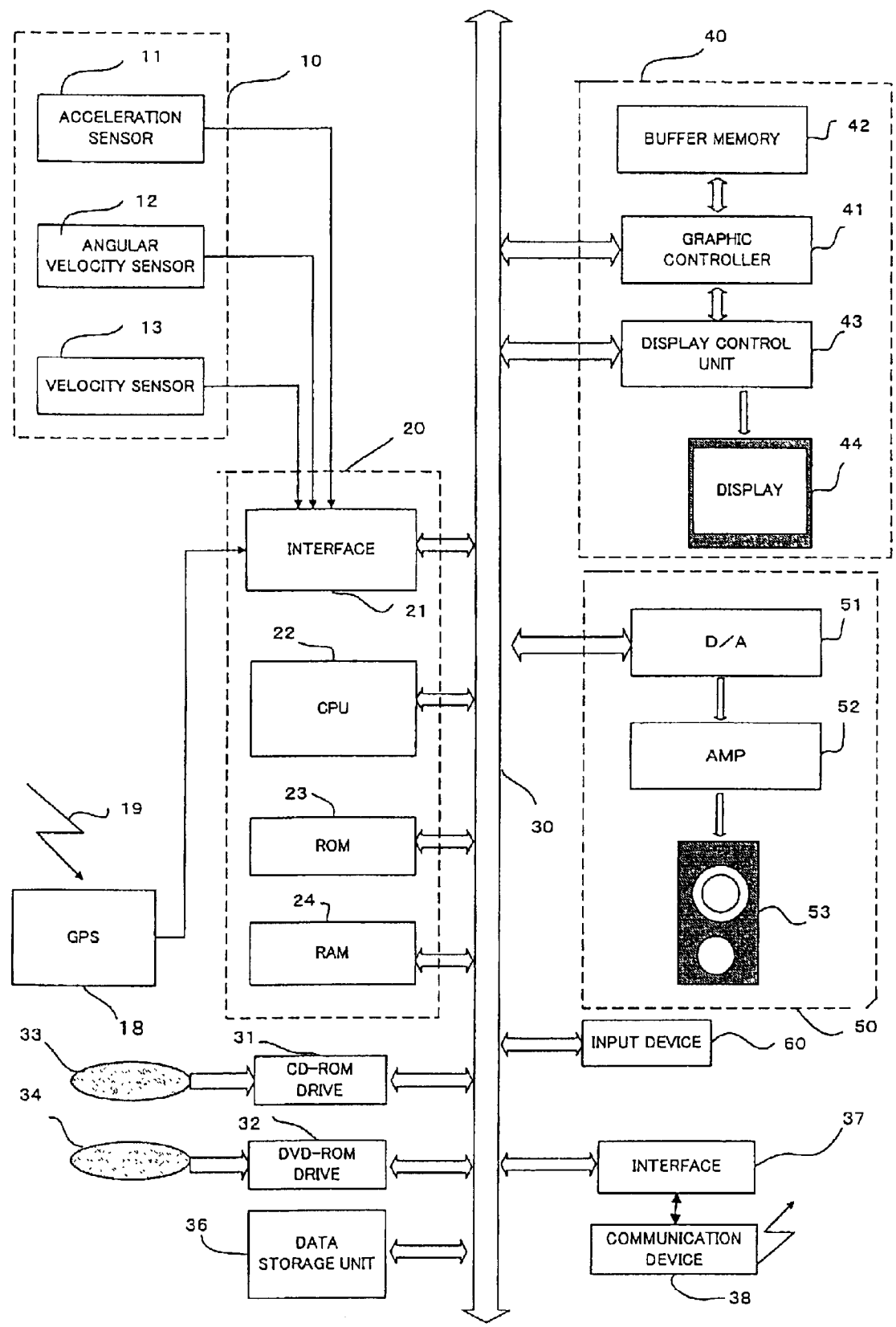
FIG. 2 is a block diagram showing a configuration of the communication-type navigation apparatus shown in FIG. 1.

FIG. 2 is a block diagram showing the navigation apparatus 7 according to the embodiment of the present invention.

As shown in FIG. 1, the navigation apparatus 7 according to the present embodiment includes a stand-alone navigation device 10, a GPS receiver 18, a system controller 20, a CD-ROM drive 31, a DVD-ROM drive 32, a data storage unit 36, a communication interface 37, a communication device 38, a display unit 40, a sound output unit 50 and an input device 60.

The stand-alone navigation device 10 includes an acceleration sensor 11, an angular velocity sensor 12 and a velocity sensor 13. The acceleration sensor 11 is formed of, for example, a piezoelectric device, and detects an acceleration of a vehicle and outputs acceleration data. The angular velocity sensor 12 is formed of, for example, a vibration gyroscope, and detects an angular velocity of a vehicle at the time of direction change of the vehicle, and outputs angular velocity data and relative bearing data.

The velocity sensor 13 is formed of a vehicle velocity sensor which detects rotation of an axle of a vehicle mechanically, magnetically or optically, and generates a vehicle velocity pulse which is a pulse signal, for every rotation for a predetermined angle of the axle.

The GPS receiver 18 receives an electric wave 19 carrying downstream line data including data for positioning, from a plurality of GPS satellites to be used for detecting an absolute position of the vehicle according to latitude and longitude information and the like.

The system controller 20 includes an interface 21, a CPU (Central Processing Unit) 22, a ROM (Read Only Memory) 23 and a RAM (Random Access Memory) 24, and is configured to control the entire navigation apparatus 7.

The interface 21 carries out interface operation with the acceleration sensor 11, the angular velocity sensor 12 and the velocity sensor 13 so as to input, to the system controller 20, the acceleration data, the relative bearing data, the angular velocity data, the GPS positioning data, the absolute bearing data and the like in addition to a vehicle velocity pulse. The CPU 22 controls the entire system controller 20. The ROM 23 has a non-volatile memory or the like (not shown) in which control programs or the like for controlling the system controller 20 is stored. The RAM 24 stores various data such as route data entered in advance by a user via the input device 60, in a readable manner, and provides a working area for the CPU 22.

The system controller 20, the CD-ROM drive 31, the DVD-ROM drive 32, the data storage unit 36, the communication interface 37, the display unit 40, the sound output unit 50 and the input device 60 are connected with each other via a bus line 30.

The CD-ROM drive 31 and the DVD-ROM drive 32 read out, under the control of the system controller 20, contents data such as audio data and/or video data, as well as control programs corresponding to the respective embodiments as will be described later, from a CD 33 and a DVD 34, respectively, and output the same. It should be appreciated that the CD-ROM drive 31 and the DVD-ROM drive 32 maybe provided solely, or a CD/DVD compatible drive may be provided.

Also, in the present invention, the map data used in the navigation apparatus 7 is basically pre-installed as described later or installed by downloading from the map data providing center 6 via the data communication. However, the navigation apparatus 7 may be configured to use the map data stored in the CD-ROM 33 or DVD-ROM 34. Especially, if the user uses special planning map disc (e.g., a golf course map, a ski area map, a tour plan guide of sightseeing spots, etc.) other than normal road map data, the CD-ROM drive 31 or the DVD-ROM drive 32 may be advantageously used.

The data storage unit 36 mainly stores map data. The map data is basically obtained by the pre-install process described later and is also obtained by downloading from the map data providing center 6 as necessary during the traveling of the vehicle. The map data thus obtained is stored in the data storage unit 36. It is noted that the data storage unit 36 may store audio data and/or video data read out from the CD-ROM drive 31 or the DVD-ROM drive 32, or the map data stored in the special planning map disc described above.

The communication device 38 is implemented by, for example, a cellular phone, and is configured to be able to download, via the communication interface 37 forming a modem or the like, map data from the data providing center 6.

The display unit 40 displays various kinds of display data under the control of the system controller 20. The display unit 40 includes a graphic controller 41 for controlling the entire display unit 40 based on control data sent from the CPU 22 via the bus line 30; a buffer memory 42 formed of a memory such as VRAM (Video RAM) and for temporarily storing image information which is ready for display; a display control unit 43 for controlling a display 44 such as liquid crystal or CRT (Cathode Ray Tube) display based on image data output from the graphic controller 41; and the display 44. The display 44 is implemented by a liquid crystal display or the like having a diagonal length of about 5 to 10 inches, for example, and is mounted in the vicinity of a front panel in a vehicle.

The sound output unit 50 includes a D/A converter 51 for performing D/A (Digital to Analogue) conversion of digital sound data sent from the CD-ROM drive 31 or the DVD-ROM 32, or from the RAM 24 or the like via the bus line 30 under the control of the system controller 20; an amplifier (AMP) 52 for amplifying an analog sound signal output from the D/A converter 51; and a speaker 53 for converting the amplified analog sound signal to sound and outputting the sound to the interior of the vehicle.

The input device 60 is configured by a key, a switch, a button, a remote-controller, a voice input device or the like. The input device 60 is disposed around the front panel of the main body of the navigation apparatus 7 mounted in the vehicle or around the display 44.

[Pre-Install System]

Next, a pre-install system for pre-installing map data will be described. In the communication-type navigation apparatus 7 according to the present invention, map data is basically obtained from the map data providing center 6 by way of data communication. However, at the time of initial setting of the navigation apparatus 7, map data of certain area that are expected to be frequently used, e.g., near the user's house, are pre-installed. Thus, it is unnecessary to download large amount of map data by data communication when the navigation apparatus is first used.

Figure 3:
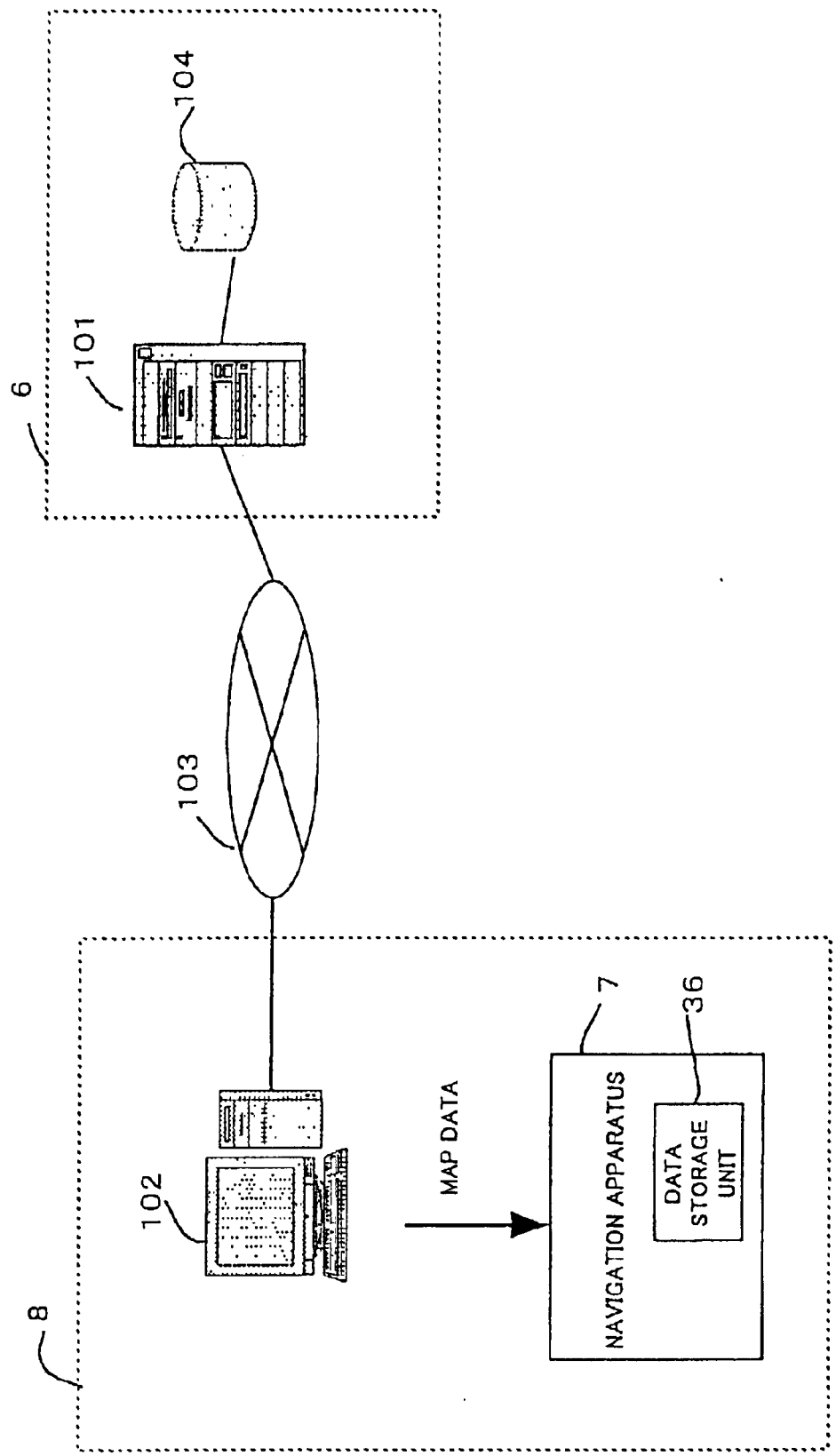
FIG. 3 is a diagram showing a configuration of a system for pre-installing map data to the communication-type navigation apparatus.

FIG. 3 schematically shows a system for pre-install processing. As shown in FIG. 3, a shop 8 and the map data providing center 6 are connected via a communication network 103. The shop 8 may be, for example, a car dealer or a car shop which deals in navigation apparatuses.

The map data providing center 6 includes a map server 101 and a map database 104. The map database 104 stores map data. The map server 101 obtains necessary map data from the map database 104 upon request from the shop 8, and transmits the map data to the shop 8 via the communication network 103.

In the shop 8, a pre-install terminal 102 is provided. The pre-install terminal 102 sends a request for the map data to be pre-installed to the user's navigation apparatus to the map data providing center 6, receives the map data, and temporarily stores it in an internal memory or the like. Then, the pre-install terminal 102 stores the map data into the data storage unit 36 in the user's navigation apparatus 7.

There are some different methods to transfer the map data from the pre-install terminal 102 to the data storage unit 36 of the navigation apparatus 7. One method is that the pre-install terminal 102 temporarily stores the map data onto a storage medium such as a DVD-RAM, a semi-conductor memory, a card-type storage medium or the like, and the storage medium is inserted into the drive unit of the navigation apparatus 7 so that the map data is read out from the storage medium and stored into the data storage unit 36 of the navigation apparatus 7.

As another method, if the data storage unit 36 is constituted by a removable medium such as a semi-conductor memory or a hard disk, the map data is transferred from the pre-install terminal 102 to the removable medium, which is then given to the user. The user simply attaches the removable medium to his or her navigation apparatus 7, thereby to complete the pre-install of the map data. It is noted that, in this method, the medium on which the map data for pre-install is stored may be delivered to the user by mail or other delivery service, and the user does not have to visit the shop 8 for pre-install process.

Other than the above-mentioned methods, the map data may be transferred to the navigation apparatus 7 by taking advantage of the communication function of the navigation apparatus 7, for example, by wireless communication with pre-install terminal 102 via infrared communication or the like, or by wired data communication with the data transfer line being connected between the pre-install terminal 102 and the navigation apparatus 7.

[Map Data]

Next, the data structure of the map data will be described. The map data is produced by a unit obtained by dividing a certain geographical region into a plurality of blocks each having a predetermined area. This unit will be hereinafter referred to as "mesh", and a unit of the map data corresponding to one mesh will be referred to as "mesh data". Namely, the map data is an aggregation of mesh data.

Figure 4:
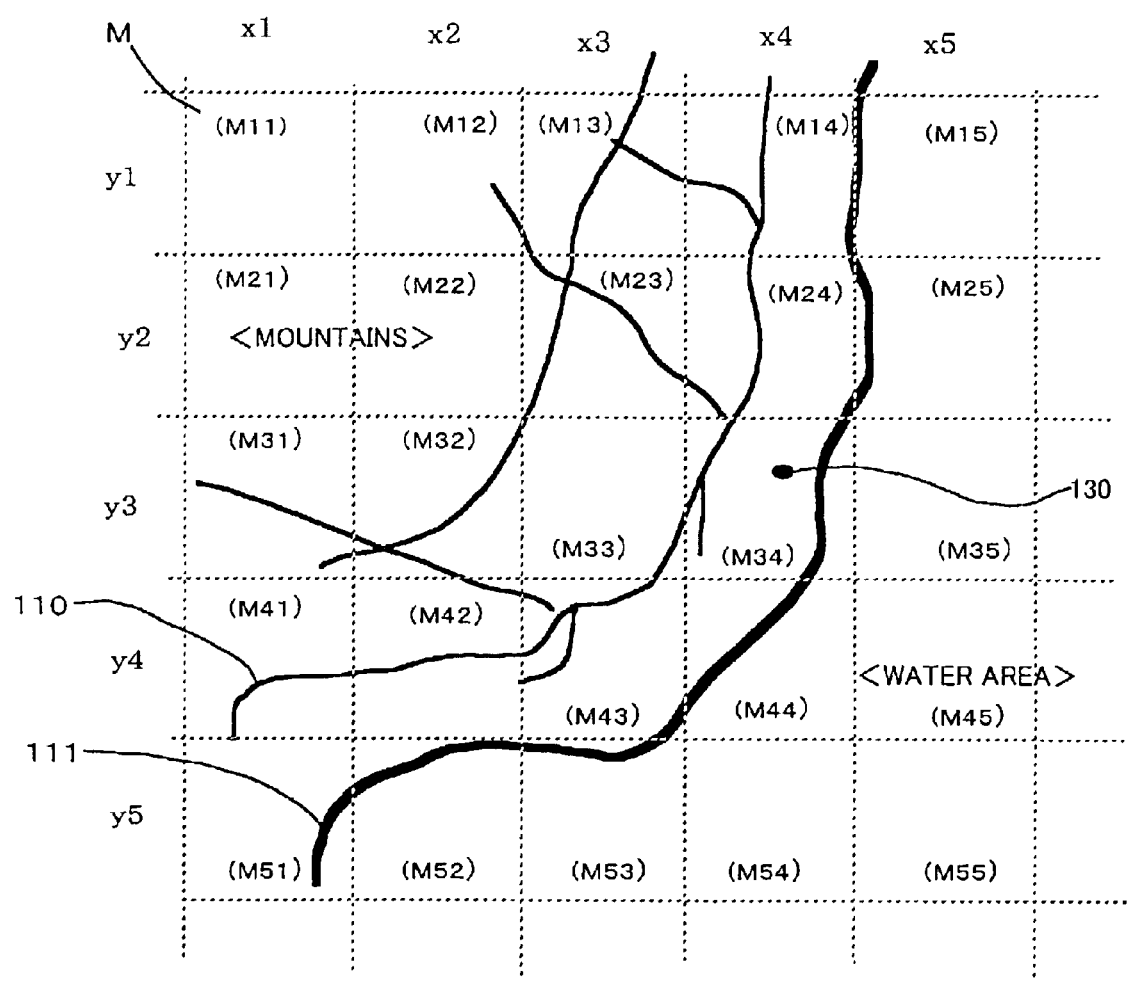
FIG. 4 is a diagram schematically showing a manner of dividing a certain geographical area into a plurality of meshes.

FIG. 4 schematically shows an example, wherein map of a certain region along a shore is divided into a plurality of meshes. In FIG. 4, the line 111 indicates the shoreline, the right side of which is water area (sea) and the left side of which is land. The left and upper area in FIG. 4 is a mountain area, and the lines 110 indicate roads.

As the map data, this region is divided into a plurality of meshes M defined in the form of lattice. In FIG. 4, the identification numbers (M11 to M55) are indicated in the meshes M. The mesh data are prepared for each meshes shown in FIG. 4. The x-coordinate and the y-coordinate correspond to the longitude and the latitude, respectively. The map shown in FIG. 4 has a certain scale, and the mesh data is produced for plural scales. The map of Japan is produced for plural scales, and the map of each scale is divided into the plural meshes to produce the mesh data.

Figure 5:
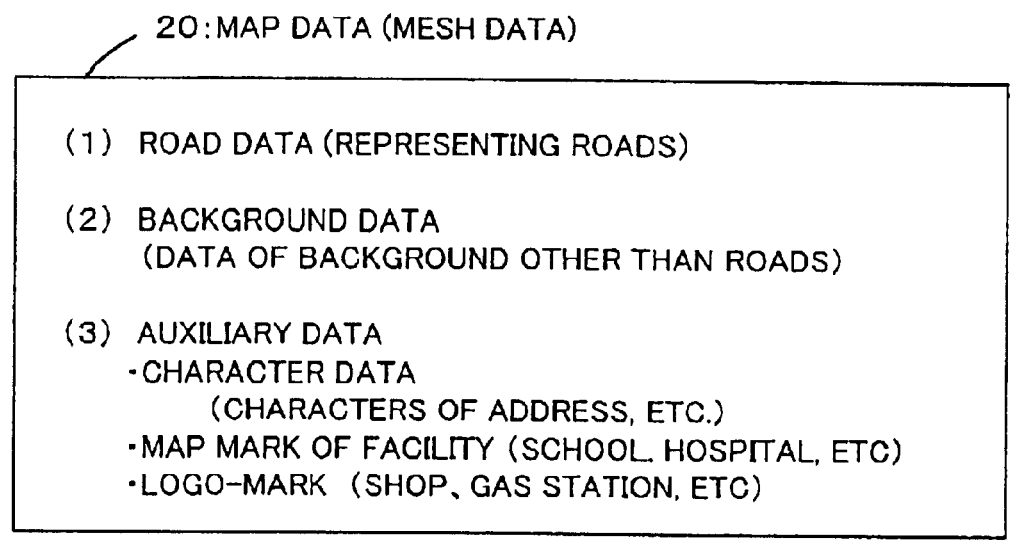
FIG. 5 shows an example of data structure of map data (mesh data)

FIG. 5 shows an example of contents of the mesh data. The mesh data roughly includes road data, background data and auxiliary data. The road data is a vector data representing the roads on the map. The background data represents the area, other than the roads, in the region shown as the map data. The navigation apparatus 7 displays map of roads together with the situation around the road. For instance, a picture of a pond is displayed if there is a pond near a road, and the geographical sections are shown on the map in an urban area. These are included in the background data.

The auxiliary data corresponds to the characters, symbols, marks and the like shown within the map, and includes character data, geographical marks and logo-marks. The navigation apparatus 7 displays map with geographical names, addresses, intersection names, station names and the like in the form of characters, and the character data represents those characters. The map may sometimes include map marks such as schools, hospitals, post offices and so on, and these are included in the data representing map marks of facilities. Further, the logo-marks such as marks representing shops, gas stations and so on are included in the auxiliary data.

As described above, the mesh data basically includes the road data, the background data and the auxiliary data.

However, there are regions for which those data do not exist. For instance, since the mesh M55 shown in FIG. 4 completely corresponds to the sea, no road, facility and shop exists. Therefore, the mesh data of mesh M55 includes only the background data, and does not include road data and auxiliary data. As the image of displayed map, the mesh M55 is shown as a simple blue area representing the sea, and the background data showing such blue sea area is included in the mesh data M55.

As appreciated, the data amount of each mesh data is different from each other. For example, the mesh data of the meshes M43 and M34 has large data amount because they include many roads intersected and shoreline. On the contrary, the mesh data of the mesh M55 completely corresponding to the sea or the mesh M11 completely corresponding to the mountain area (with no road) has small data amount.

As described above, since the map data is produced as the plural mesh data prepares for plural different mesh data, the pre-install process is also executed by the unit of the mesh data. Namely, the pre-install is executed by storing the plural mesh data into the data storage unit 36 of the navigation apparatus 7.

[Pre-Install Method]

Next, various examples of pre-install method will be described.

1st EXAMPLE

Figure 6:
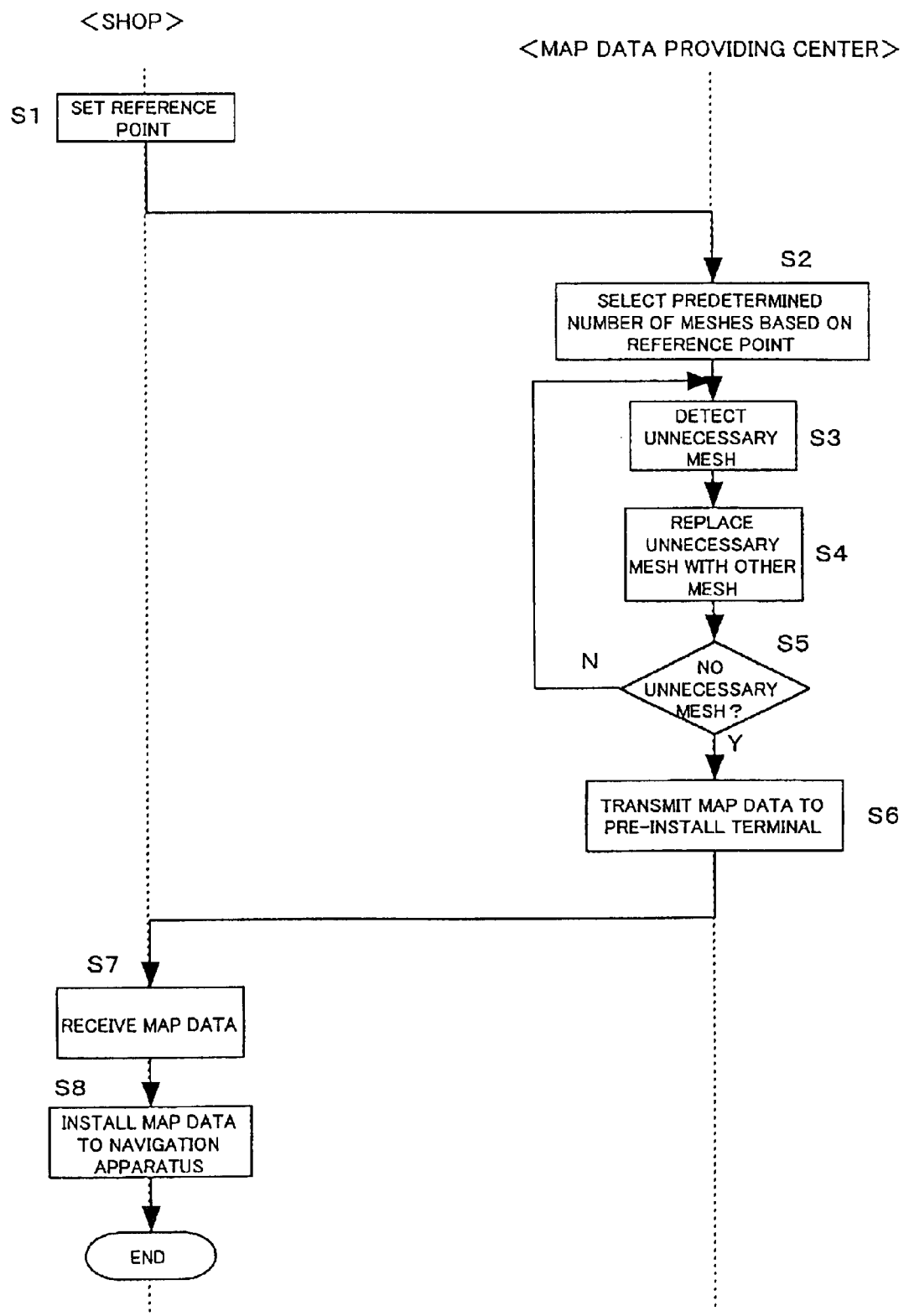
FIG. 6 is a flowchart of a first example of map data pre-install method.

The first example of the pre-install method will be described with reference to FIGS. 3, 4 and 6. FIG. 6 is a flowchart showing the first pre-install method. It is noted that the following example is directed to the situation that, in the system shown in FIG. 3, a user who purchased the navigation apparatus 7 visited the shop 8 and a shop clerk operates the pre-install terminal 102 to execute the pre-install process based on the necessary information given by the user. In addition, the pre-install terminal 102 may be a terminal device such as a personal computer or the like, having a communication function via a communication network, and operates as the pre-install terminal by executing a pre-install program. Similarly, the map server 101 performs the pre-install process by executing the following steps of the pre-install program.

First, the shop clerk operates the pre-install terminal 102 to input a reference point that the user has designated (step S1). The "reference point" is a geographical point serving as a reference to determine the range of map data to be pre-installed. The reference point may be set to an arbitrary point that the user desires, and normally the user would set a place he or she frequently visit, e.g., the house, the workplace or else, to the reference point. It is noted that, as the input method of the reference point, the shop clerk may input the address of the user as the reference point, during the execution of the pre-install program.

The information of the reference point thus set is transmitted to the map data providing center 6 via the communication network 103. The map server 101 of the map data providing center 6 selects meshes of a predetermined number D according to a predetermined method based on the reference point, and temporarily stores the selected meshes in a memory (not shown) in the map server 101 (step S2).

The predetermined number D of the meshes to be selected may be determined, for example, based on the size of the storage area usable for storing the pre-installed map data in the data storage unit 36 of the navigation apparatus 7. Namely, if the storage area for the pre-installed map data has the storage capacity X and the average data amount of one mesh data is Y, the predetermined number D may be obtained as: $D=X/Y$.

In another method of determining the predetermined number D, a certain range of area which the user may normally visit during his or her usual activity or frequently visit from the reference point (normally, the user's house) is statistically examined and determined as the pre-install area, and the number of the meshes that, covers the pre-install area thus determined as the predetermined number D. For example, if there is statistic data showing that the range of area in which the user visit during the normal activity is within 20 km from the house or the workplace, the number of the meshes may be determined to cover that area.

As the method of selecting the meshes, for example, the mesh to which the reference point belongs is set to the center, and a certain rectangular or circular area is defined from the center so that the predetermined number of meshes are selected in the rectangular or circular manner within the defined area. It is noted that the above-mentioned methods of selection are simply examples, and other method of determining the number D of meshes or selecting the meshes may be used in the present invention.

When the meshes of the predetermined number D are selected based on the reference point, the map server 101 detects unnecessary meshes from the meshes thus selected (step S3). The "unnecessary mesh" is a mesh which is not needed (i.e., not used in the route guidance and/or route search) by the navigation apparatus 7. Basically, it is possible to determine the unnecessary meshes based on whether or not the road data is included in the mesh. In the example of FIG. 4, the mesh data of meshes M11 and M21, in which no road exists, and the mesh data of meshes M54 and M55, in which only the water area (sea) is included and no land exists, may be determined as unnecessary meshes. In this way, by determining the meshes including no road data as the unnecessary meshes, the map server 101 can detect the unnecessary meshes by examining whether or not each mesh data includes road data or not for the predetermined number of mesh data D selected in step S2.

Then, the map server 101 replaces the detected unnecessary meshes with other meshes (step S4). The new meshes for the replacement may be determined, for example, by selecting the mesh located on the map in the opposite side of the detected unnecessary mesh, with the reference point serving as a center line (reference line). This is based on the assumption that, since the mountain area and/or the water are generally set as the unnecessary area, if such an unnecessary mesh is detected, it is relatively unlikely that the area opposite to the area of the unnecessary meshes corresponding to the mountain or water area is also the mountain or water area. Namely, if one mesh is determined as the unnecessary mesh because it belongs to mountain or water area, it is relatively likely that the area opposite to that area is not such mountain or water area. In addition, as another method of selecting new meshes for replacement, the meshes neighboring to the meshes that has been already selected are selected in turn.

When the unnecessary meshes are replaced with other new meshes in step S4, it is determined whether or not no unnecessary mesh is included in the meshes selected in step S2 (step S5). In this way, by the execution of steps S3 to S5, all of the unnecessary meshes included in the predetermined number of meshes selected in step S2 are replaced. While it is possible that the newly selected mesh is also an unnecessary mesh, in that case, the mesh is detected in step S3 as the unnecessary mesh and is replaced. Therefore, when the determination in step S5 results affirmative (Yes), all of the predetermined number of meshes are not the unnecessary mesh.

Thus, the predetermined number of meshes do not include unnecessary mesh, and the map server 101 transmits the mesh data of those meshes to the pre-install terminal 102 via the communication network 103 (step S6). The pre-install terminal 102 receives the mesh data (step S7), and installs it into the data storage unit 36 of the navigation apparatus 7 (step S8). Various method of installing the map data into the data storage unit 36 may be utilized. Thus, the pre-install process ends.

Next, a specific example of the above pre-install process will be described. It is now assumed that the user of the navigation apparatus 7, subject to the pre-install process, sets the point 130 in FIG. 4 as the reference point. If it is determined in step S2 that nine meshes, vertically three meshes and horizontally three meshes, around the reference point serving as a center, are to be selected, the meshes M23 to M25, M33 to M35 and M43 to M45 are selected in step S2. Here, the meshes M35 and M45 completely correspond to the water area and hence are detected as the unnecessary meshes in step S3 and are replaced with other meshes in step S4. For example, the replacement rule is to replace the unnecessary mesh with a mesh opposite to the unnecessary mesh with respect to the mesh including the reference point as the center, the meshes M35 and M45 are replaced with the meshes M22 and M32 in step S4.

Then, when it is determined whether or not the unnecessary mesh still exists, it is found that the newly selected mesh M22 corresponds to the area in the mountain area in which no road exists and is an unnecessary mesh. Then, the steps S3 to S5 are executed again, and the mesh M22 is replaced with the mesh M42 which is on the opposite side of the initial meshes M35 and M45 with respect to the mesh M34 including the reference point 130. Then, in step S5, it is detected that no unnecessary mesh is included, and hence the mesh data of predetermined number D, including no unnecessary mesh, are obtained. As a result, the mesh data to be pre-installed to the navigation apparatus 7 are determined to the meshes M23 to M25, M32 to M34 and M42 to M44, and includes no unnecessary meshes corresponding to the mountain or water area.

As described above, according to the pre-install process of the present invention, the map data which are within a predetermined range from the reference point set by the user and which do not include unnecessary meshes corresponding to the mountain and/or water area are pre-installed. Since the data amount of the map data that can be installed in the navigation apparatus is limited by the storage capacity of the data storage unit 36 of the navigation apparatus 7 and/or other reason, only effective map data may be efficiently pre-installed by the above pre-install process of the present invention.

2nd EXAMPLE

Figure 8:
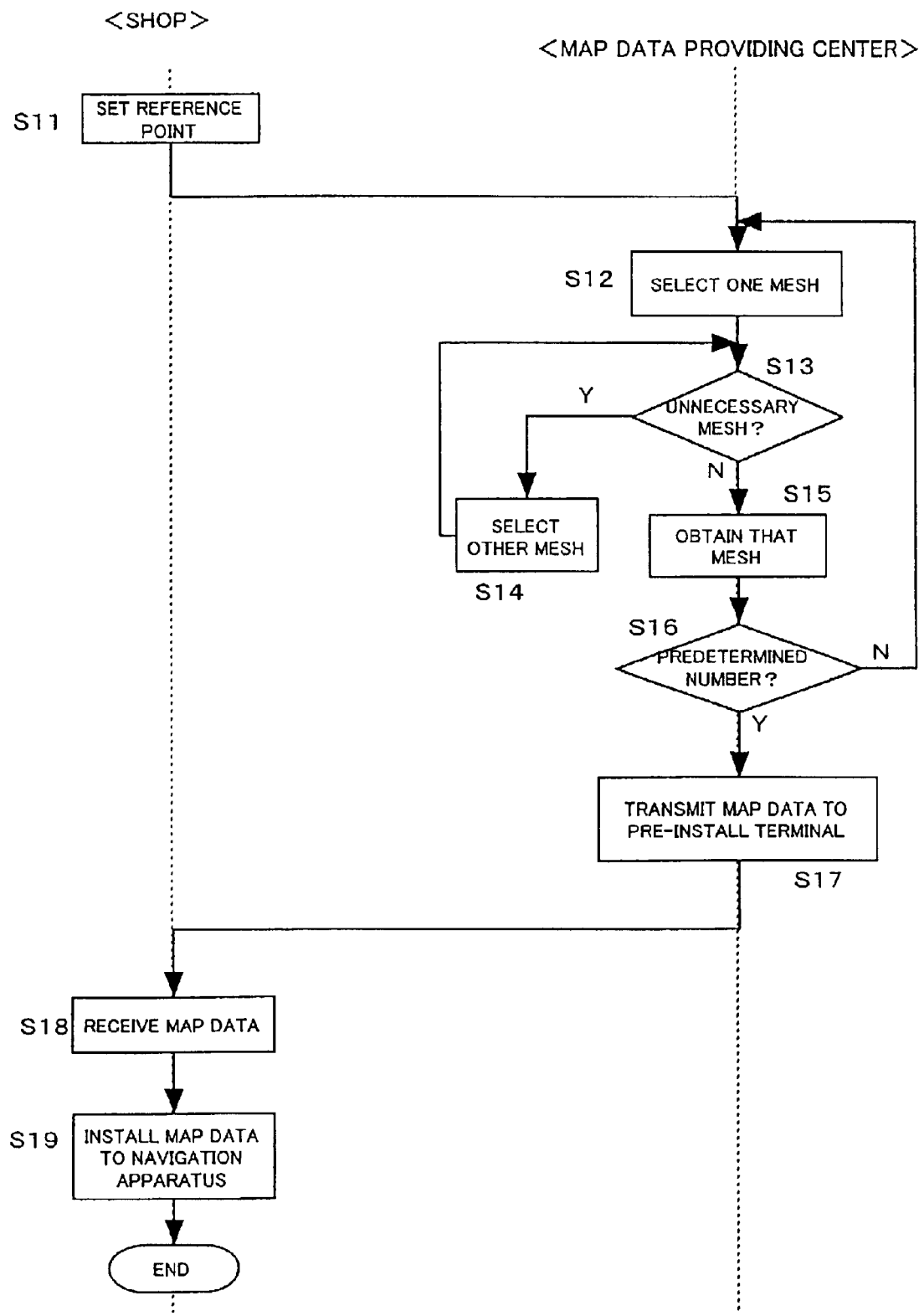
FIG. 8 is a flowchart of a second example of map data pre-install method.
Figure 9:
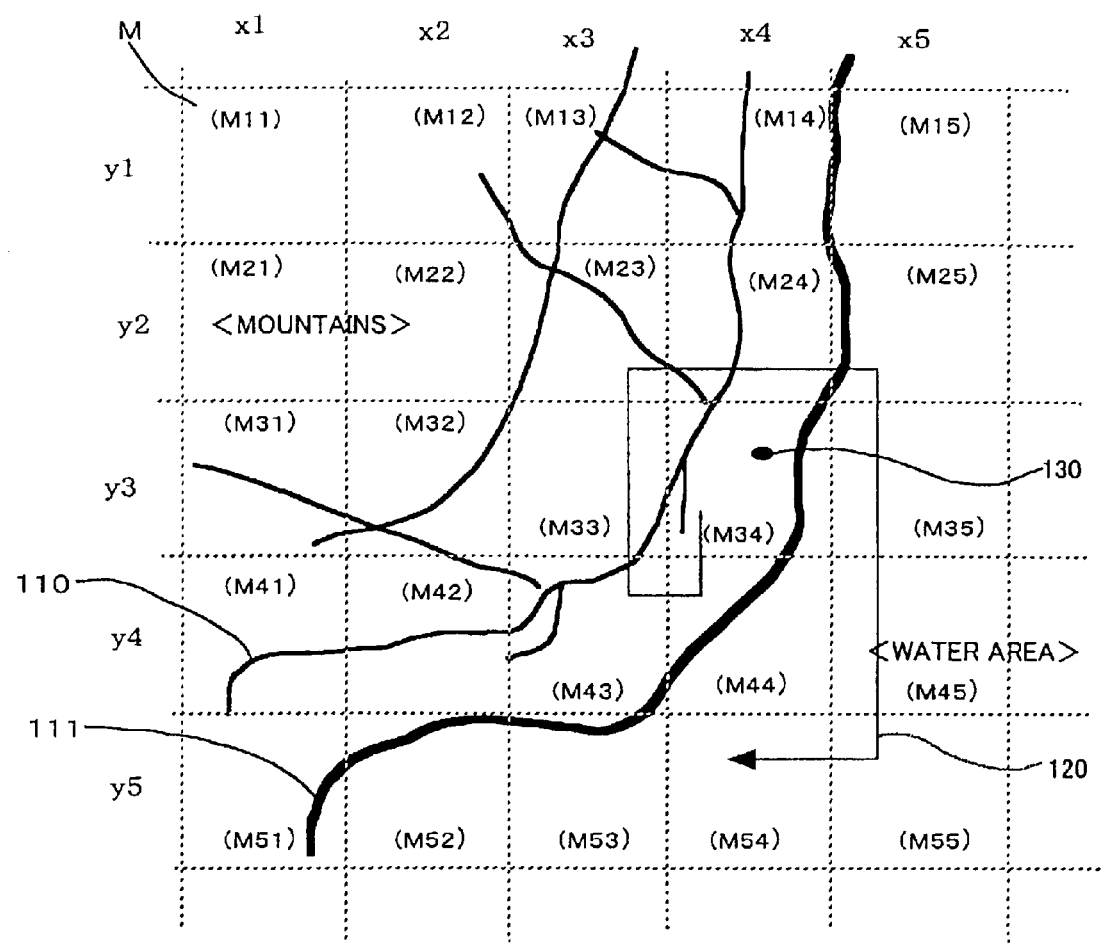
FIG. 9 is a diagram illustrating an order of selecting meshes according to the second example of map data pre-install method.

Next, the second example of the pre-install method will be described with reference to FIGS. 8 and 9. FIG. 8 shows a flowchart of the second pre-install method, and FIG. 9 schematically shows the second pre-install method.

In the first example of pre-install method, when the reference point is set, first a predetermined number of meshes are selected, and then the unnecessary meshes included therein are replaced with other effective (necessary) meshes. On the contrary, in the second pre-install method, when the reference point is set, the effective mesh is determined one by one with judging whether or not that mesh is necessary or unnecessary.

In FIG. 8, when the user sets the reference point similarly to the first pre-install method (step S1), the information of the reference point is transmitted to the map data providing center 6, and the map server 101 selects one mesh based on the reference point (step S12). FIG. 9 shows the method to select the mesh one by one. In the example of FIG. 9, the meshes are selected in the clockwise direction from the position of the reference point serving as a center (see. the arrow 120 showing the selection order). Then, it is determined whether or not the selected mesh is an unnecessary mesh or not (step S13). If it is an unnecessary mesh, next mesh is selected according to the selection order 120 (step S14), and the process goes back to step S13 to determine whether or not the mesh is an unnecessary mesh.

When it is determined that the selected mesh is not unnecessary mesh, the map server 101 obtains the mesh data of the mesh from the map database 104 (step S15), and then determines whether or not a predetermined number (D) of meshes are determined (step S16). If the predetermined number of meshes have not been obtained, the process goes back to step S12 to select next one mesh and repeats the same steps.

Figure 7:
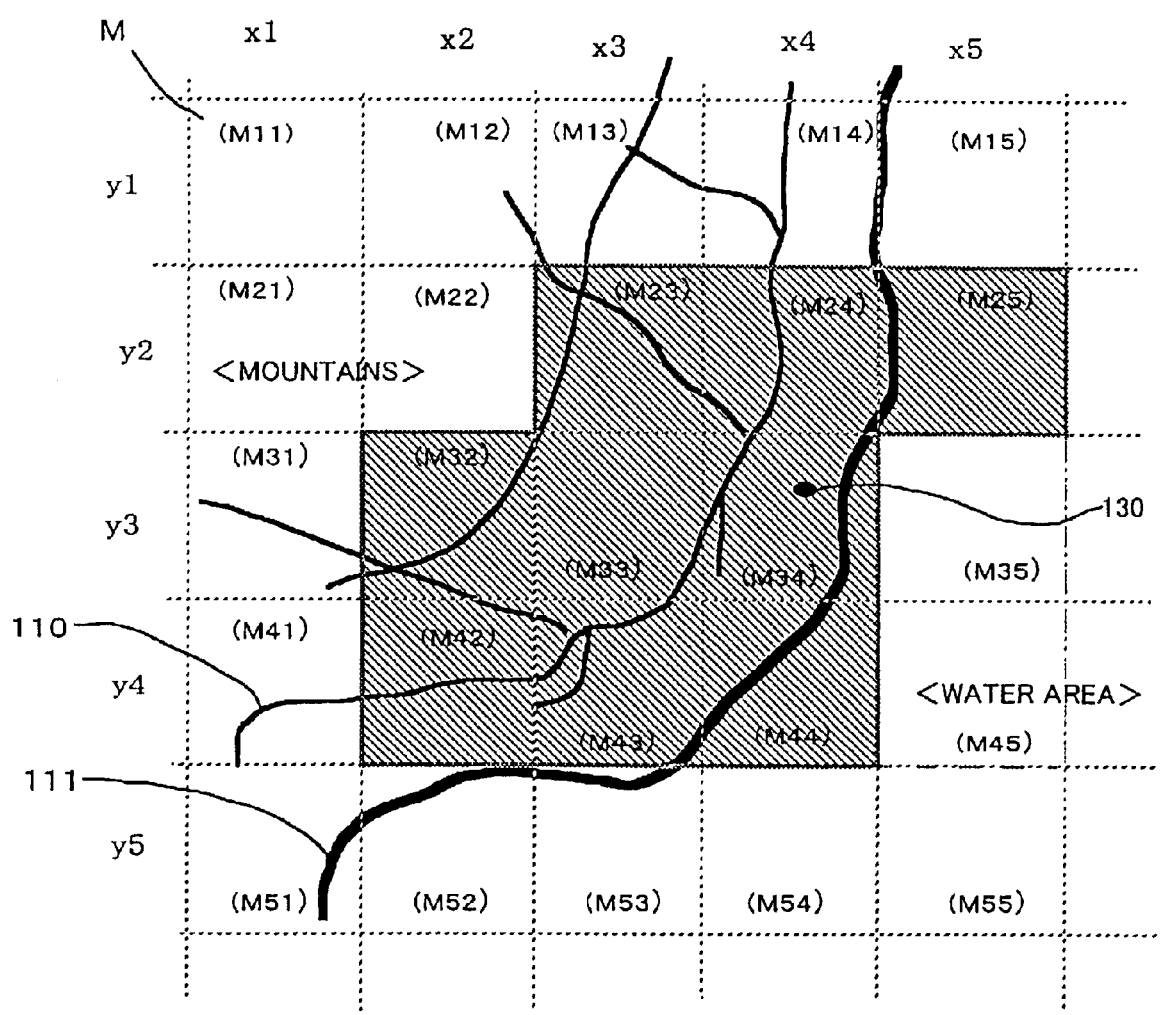
FIG. 7 shows an example of mesh data for map data pre-install.

In this way, when predetermined number of meshes, including no unnecessary mesh, are determined (step S16; Yes), the map server 101 transmits the mesh data of those meshes to the pre-install terminal 102 in the shop 8 (step S17). In the shop 8, the pre-install terminal 102 receives the mesh data (step S18), and stores those mesh data into the data storage unit 36 of the navigation apparatus 7 in the manner already described. Eventually, the mesh data thus obtained are the same as those obtained by the first pre-install method as shown in FIG. 7. Therefore, the user can pre-install the effective mesh data based on the reference point that he or she set.

3rd EXAMPLE

Figure 10:
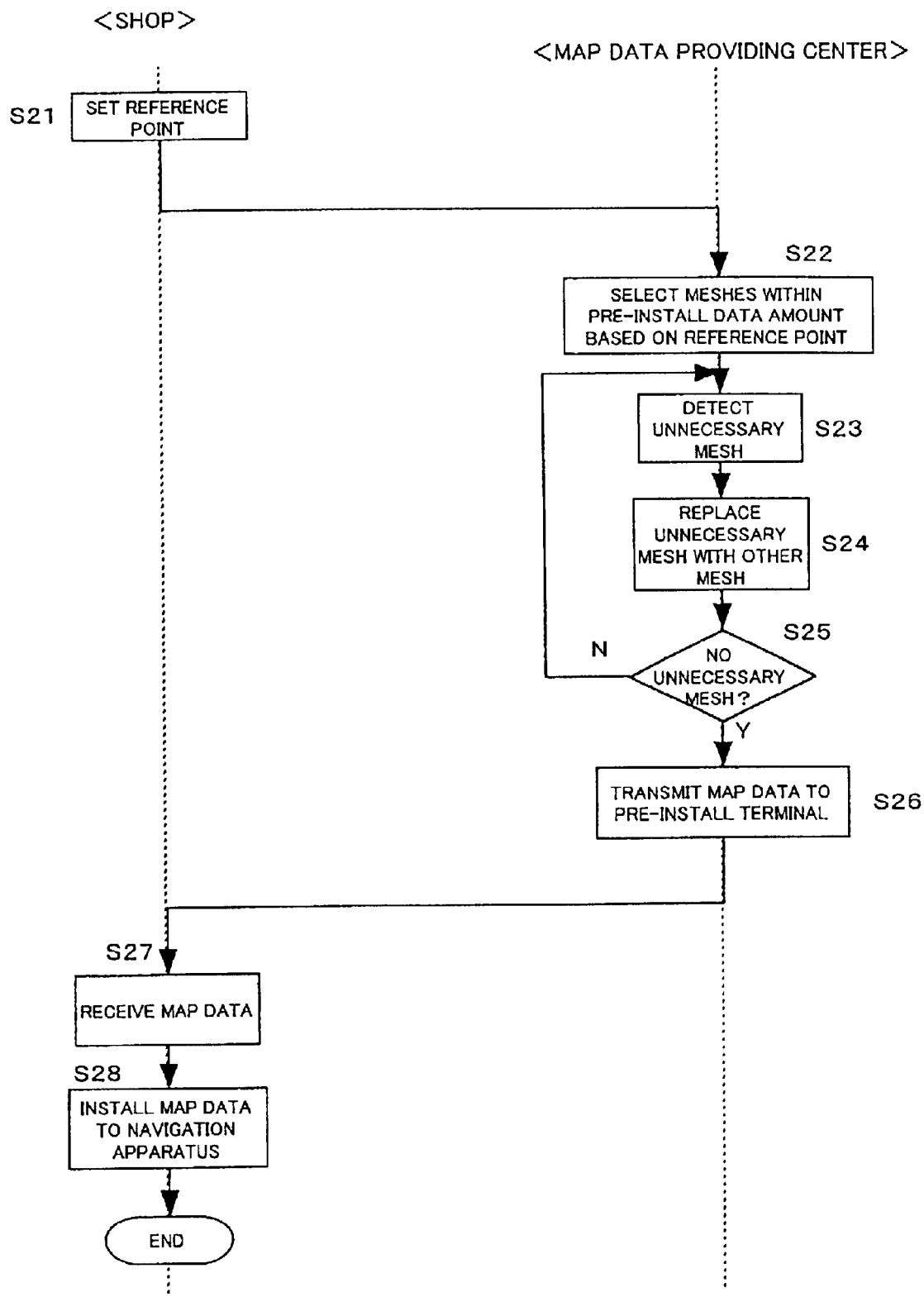
FIG. 10 is a flowchart of a third example of map data pre-install method.

Next, the third example of the pre-install method will be described with reference to FIGS. 3, 4 and 10. FIG. 10 is a flowchart showing the third pre-install method.

First, the shop clerk operates the pre-install terminal 102 to input a reference point that the user has designated (step S21). The information of the reference point thus set is transmitted to the map data providing center 6 via the communication network 103. The map server 101 of the map data providing center 6 selects a plurality of meshes according to a predetermined method based on the reference point such that the total data amount of the selected mesh data is about equal to a predetermined pre-install data amount, and temporarily stores the selected meshes in a memory (not shown) in the map server 101 (step S22).

The pre-install data amount is a data amount determined, in advance, as the total amount of the map data to be pre-installed in the navigation apparatus 7. Actually, the pre-install data amount approximately corresponds to the size of the storage area usable for storing the pre-installed map data in the data storage unit 36 of the navigation apparatus 7. The pre-install data amount may be determined as follows. Namely, a certain range of area which the user may normally visit during his or her usual activity or frequently visit from the reference point (normally, the user's house) is statistically examined and determined as the pre-install area, and the pre-install amount may be determined to cover the pre-install area thus determined. For example, if there is statistic data indicating that the range of area in which the user visit during the normal activity is within 20 km from the house or the workplace, the number of the meshes may be determined to cover that area.

The process after step S22 is basically the same as that in the first pre-install method shown in FIG. 6. Namely, when the plurality of meshes are selected based on the reference point, the map server 101 detects unnecessary meshes from the meshes thus selected (step S23). Then, the map server 101 replaces the detected unnecessary meshes with other meshes (step S24). When the unnecessary meshes are replaced with other new meshes in step S24, it is determined whether or not no unnecessary mesh is included in the meshes selected in step S22 (step S25). In this way, by the execution of steps S23 to S25, all of the unnecessary meshes included in the plural meshes selected in step S22 are replaced.

Thus, the plurality of selected meshes do not include unnecessary mesh, and the map server 101 transmits the mesh data of those meshes to the pre-install terminal 102 via the communication network 103 (step S26). The pre-install terminal 102 receives the mesh data (step S27), and installs it into the data storage unit 36 of the navigation apparatus 7 (step S28). Various method of installing the mesh data into the data storage unit 36 may be utilized. Thus, the pre-install process ends.

The specific example of the third pre-install method is similar to that of the first pre-install method shown in FIG. 7. It is now assumed that the user of the navigation apparatus 7, subject to the pre-install process, sets the point 130 in FIG. 4 as the reference point. If it is determined in step S22 that the meshes M23 to M25, M33 to M35 and M43 to M45 are selected in step S2, by selecting the meshes within the pre-install data amount. Here, the meshes M35 and M45 are completely correspond to the water area and hence are detected as the unnecessary meshes in step S23 and are replaced with other meshes in step S24. For example, the replacement rule is to replace the unnecessary mesh with a mesh opposite to the unnecessary mesh with the mesh including the reference point as the center, and hence the meshes M35 and M45 are replaced with the meshes M22 and M32 in step S24.

Then, when it is determined whether or not the unnecessary mesh still exists, it is found that the newly selected mesh M22 corresponds to the area in the mountain area in which no road exists and is an unnecessary mesh. Then, the steps S23 to S25 are executed again, and the mesh M22 is replaced with the mesh M42 which is on the opposite side of the initial meshes M35 and M45 with respect to the mesh M34 including the reference point 130. Then, in step S25, it is detected that no unnecessary mesh is included, and hence the mesh data of predetermined number, including no unnecessary mesh, are obtained. As a result, the mesh data to be pre-installed to the navigation apparatus 7 are determined to the meshes M23 to M25, M32 to M34 and M42 to M44, and includes no unnecessary meshes corresponding to the mountain or water area.

As described above, according to the third pre-install method of the present invention, the map data which are within a predetermined range from the reference point set by the user and which do not include unnecessary meshes corresponding to the mountain and/or water area are pre-installed. Since the data amount of the map data that can be installed in the navigation apparatus is limited by the storage capacity of the data storage unit 36 of the navigation apparatus 7 and/or other reason, only effective map data may be efficiently pre-installed by the above pre-install process of the present invention.

4th EXAMPLE

Figure 11:
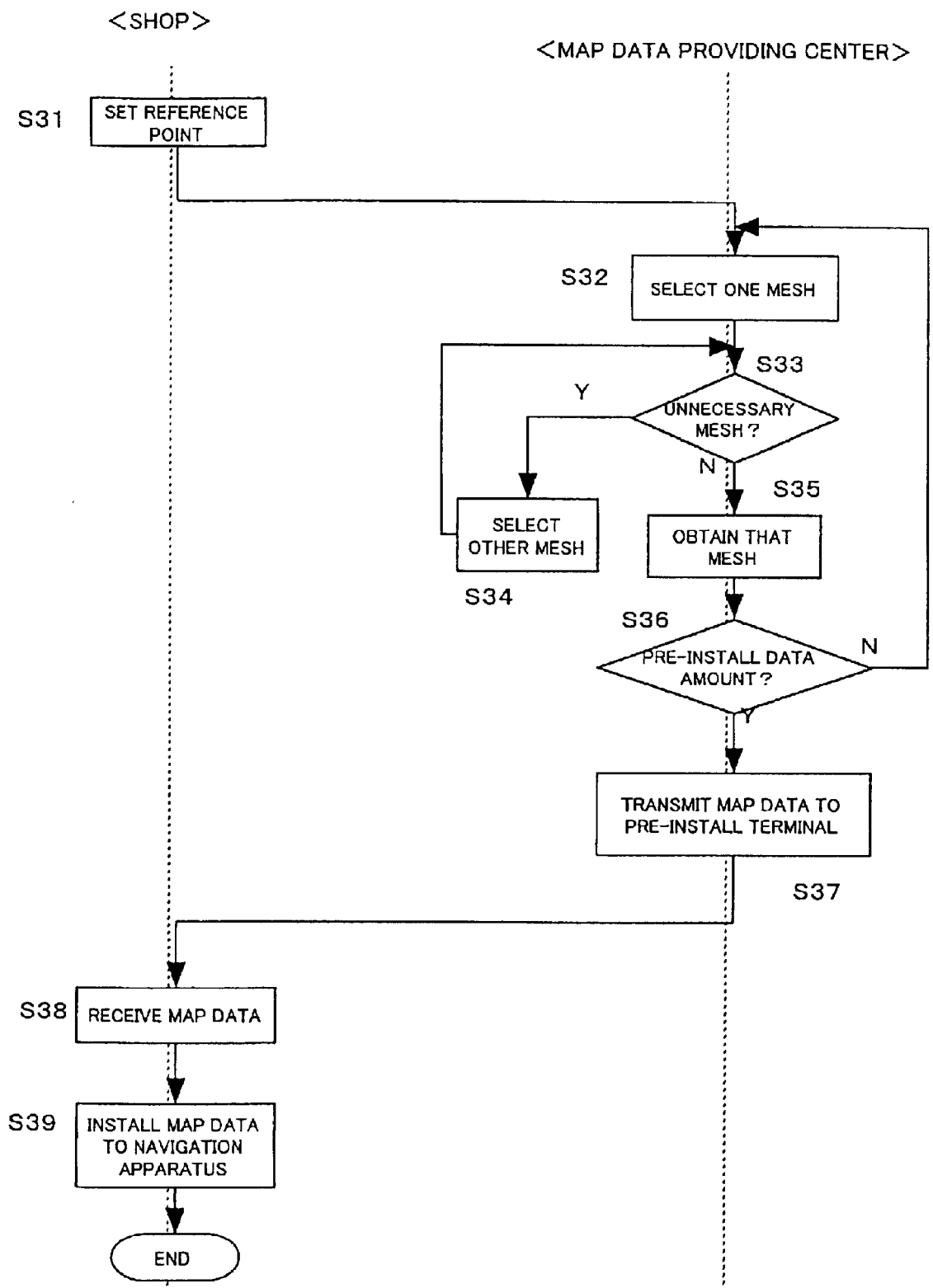
FIG. 11 is a flowchart of a fourth example of map data pre-install method.

Next, the fourth example of the pre-install method will be described with reference to FIGS. 9 and 11. FIG. 11 shows a flowchart of the fourth pre-install method. FIG. 9 is also used to schematically show the fourth pre-install method.

In the third example of pre-install method, when the reference point is set, first a plurality of meshes are selected within the pre-install data amount, and then the unnecessary meshes included therein are replaced with other effective (necessary) meshes. On the contrary, in the fourth pre-install method, when the reference point is set, the effective mesh is determined one by one with judging whether or not that mesh is necessary or unnecessary.

In FIG. 11, when the user sets the reference point similarly to the third pre-install method (step S31), the information of the reference point is transmitted to the map data providing center 6, and the map server 101 selects one mesh based on the reference point (step S32). FIG. 9 shows the method to select the mesh one by one. In the example of FIG. 9, the meshes are selected in the clockwise direction from the position of the reference point serving as a center (see. the arrow 120 showing the selection order). Then, it is determined whether or not the selected mesh is unnecessary mesh or not (step S33). If it is an unnecessary mesh, next mesh is selected according to the selection order 120 (step S34), the process goes back to step S33 to determines whether or not the mesh is an unnecessary mesh.

When it is determined that the selected mesh is not unnecessary mesh, the map server 101 obtains the mesh data of the mesh from the map database 104 (step S35), and then determines whether or not the total data amount of the selected mesh data reaches the pre-install data amount (step S36). If the total data amount does not reach the pre-install data amount, the process goes back to step S32 to select next one mesh and repeats the same steps.

In this way, when a plurality of meshes, including no unnecessary mesh, are determined within the pre-install data amount (step S36; Yes), the map server 101 transmits the mesh data of those meshes to the pre-install terminal 102 in the shop 8 (step S37). In the shop 8, the pre-install terminal 102 receives the mesh data (step S38), and stores those mesh data into the data storage unit 36 of the navigation apparatus 7 in the manner already described. Eventually, the mesh data thus obtained are the same as those obtained by the first pre-install method as shown in FIG. 7. Therefore, the user can pre-install the effective mesh data based on the reference point that he or she set.

5th EXAMPLE

Figure 12:
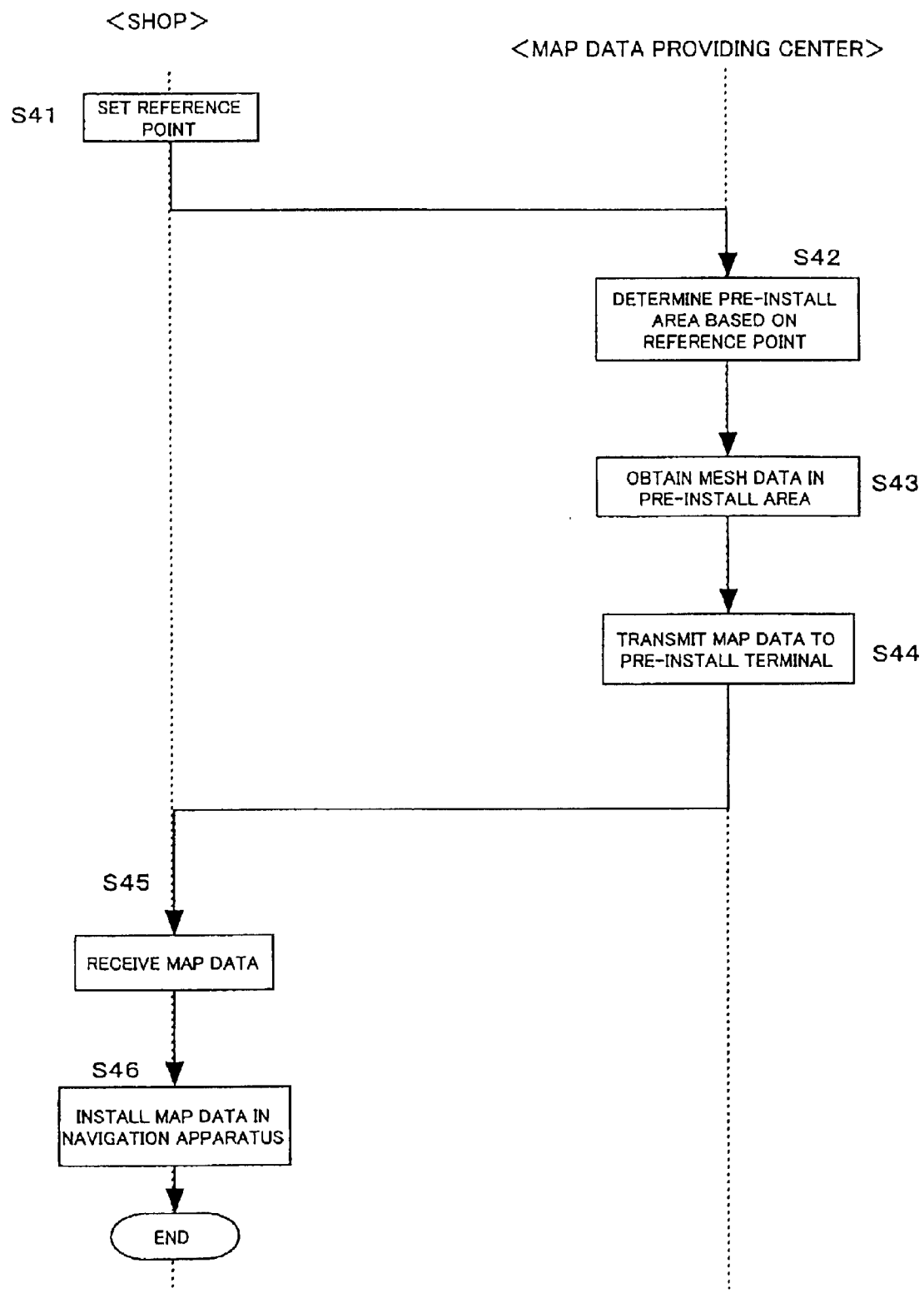
FIG. 12 is a flowchart of a fifth example of map data pre-install method.

Next, the fifth embodiment of the pre-install method will be described. FIG. 12 is a flowchart showing the fifth embodiment of the pre-install method. By referring to FIG. 12, first the shop clerk operates the pre-install terminal 102 to input the reference point that the user has designated (step S41). The information of the reference point is transferred to the map data providing center 6 via the communication network 103. The map server 101 of the map data providing center 6 determines the pre-install area according to a method described later (step S42). When the pre-install area is determined based on the reference point, the map server 101 obtains the mesh data corresponding to the pre-install area thus determined from the map database 104 (step S43). Then, the map server 101 transmits the mesh data thus obtained to the pre-install terminal 102 via the communication network 103 (step S44). The pre-install terminal 102 receives the mesh data (step S45), and installs the mesh data into the data storage unit 36 of the navigation apparatus 7. This step may be performed by various ways described above. Thus, pre-install process ends.

Next, the description will be given of the method of determining the pre-install area performed in step S42. First, if the user sets one reference point in step S41, the pre-install area may be an area within a predetermined distance from the reference point. For example, an area defined by a circle having the reference point as its center and having a radius of a predetermined distance may be determined as the pre-install area. In another example, a square area having a side of a predetermined distance, or a rectangular area may be determined as the pre-install area.

On the other hand, if the user sets two or more reference points, the pre-install area can be determined in the following methods. The first to fourth methods to determine the pre-install area based on two or more reference points are schematically shown in FIGS. 13A to 13D. FIGS. 13A to 13D shows the examples in which the user sets three reference points A to C.

Figure 13A:
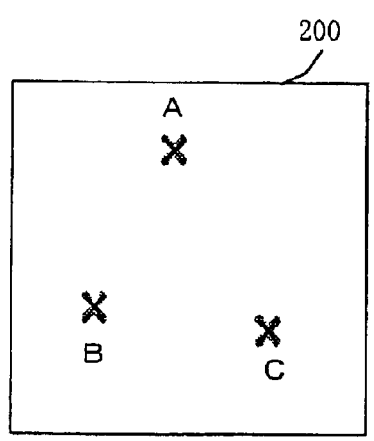
FIGS. 13A to 13D show manners of determining pre-install area based on a plurality of reference positions.

The first method shown in FIG. 13A determines the pre-install area to a continuous area 200 including all of the plural reference points set by the user. While the area 200 is a rectangular area in FIG. 13A, the pre-install area may take the form of a circle, an ellipse, a triangle or other shape including all of the reference points. Further, if more mesh data can be stored in the data storage unit 36 of the navigation apparatus 7, the meshes surrounding the area 200 may be selected and the corresponding mesh data may be pre-installed into the navigation apparatus 7.

Figure 13B:
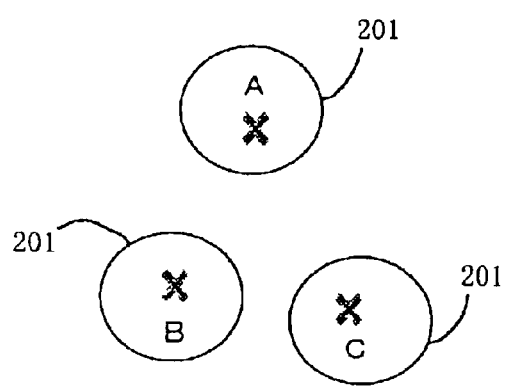

The second method shown in FIG. 13B sets separate areas 201 around each of the plural reference points that the user has set, and the pre-install area is defined as the aggregation of those separate areas. Therefore, the regions between the separate areas 201 are not included in the pre-install area and corresponding map data are not pre-installed. It is noted that the separate area 201 may have other shape than the circle shown in FIG. 13B, i.e., an ellipse, a triangle or else.

Figure 13C:
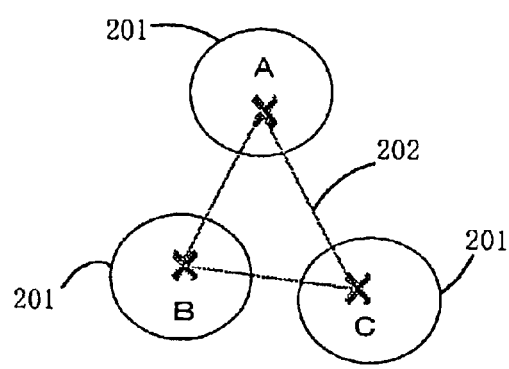

The third method shown in FIG. 13C first defines the separate area 201 around the reference points, similarly to the second method, and then the inside of a polygon formed by connecting the reference points is included into the pre-install area. Namely, in the example of FIG. 13C, the three separate areas 201 corresponding to the reference points A to C, and the inside area 202 of the polygon (triangle in this example) formed by connecting the reference points A to C are determined as the pre-install area.

Figure 13D:
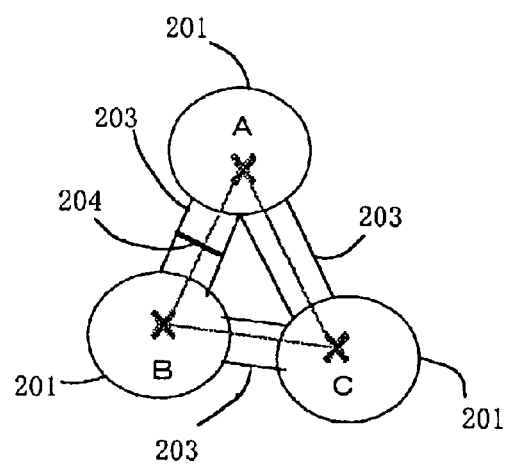

The fourth method shown in FIG. 13D first defines the separate areas 201 around each of the reference points, similarly to the second method, and further the connection areas 203 connecting the separate points and having a predetermined width are included in the pre-install area. The width 204 of the connecting area 203 may be set to a predetermined distance. In the example of FIG. 13D, in addition to the three separate areas 201 corresponding to the three reference points A to C, the three connecting areas 203 are also included in the pre-install area.

In any one of the first to fourth methods, the map data around the plural reference points that the user has set are pre-installed. In addition, according to the first method shown in FIG. 13A, since the continuous area including all of the three reference points is set to the pre-install area, the map data of the area between the three reference points and the area surrounding the reference points can be pre-installed.

However, if the distance between the reference points is long, the first method cannot be used because of the total data amount of the map data that can be pre-installed. In that case, it is preferred that the area around each reference point is included in the pre-install area according to the second method, and if more data can be pre-installed, the inside of the polygon formed by the reference points may be included in the pre-install area by the third method as shown in FIG. 13C, or the connecting areas connecting the reference points and having a certain width may be included in the pre-install area by the fourth method as shown in FIG. 13D. When the user sets two or more reference points, the user frequently move between those reference points. Therefore, it is advantageous to include the area between the reference points set by the user to the pre-install area.

6th EMBODIMENT

Next, the sixth embodiment of the pre-install method will be described with reference to FIG. 14. The fifth embodiment described above is directed to the situation that the pre-install data amount is not limited, or the first to fourth methods shown in FIGS. 13A to 13D can be applied within the pre-install data amount. On the contrary, according to the sixth embodiment, the map data is appropriately pre-installed under the limitation of the pre-install data amount.

In the following example, the pre-install data amount is limited by the number of meshes that constitute the pre-install area. Namely, when the number of the meshes selected for the pre-install area reaches a predetermined number, further selection of the mesh is stopped, and the mesh data corresponding to the meshes selected until then are determined as the map data to be pre-installed.

Figure 14:
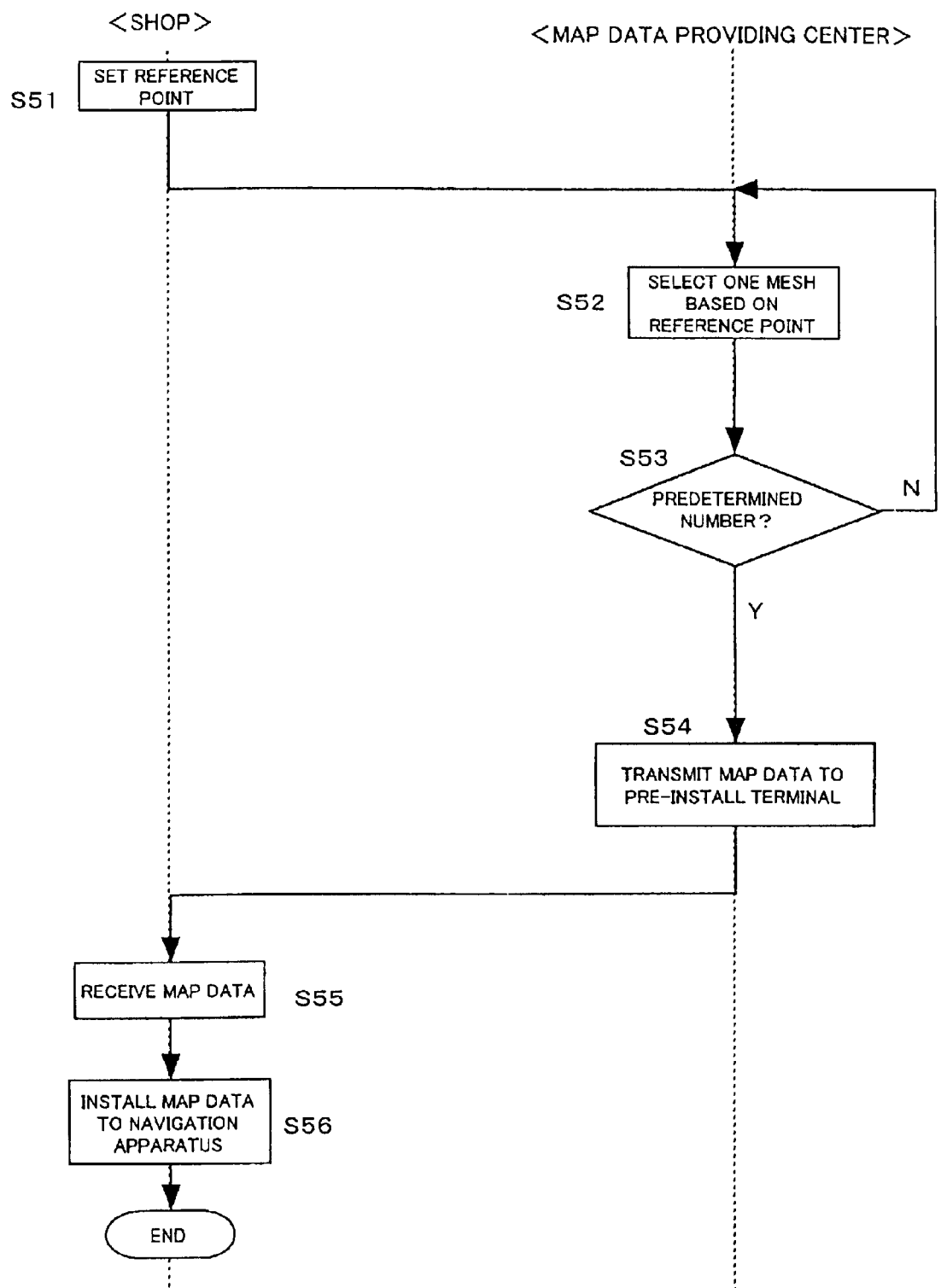
FIG. 14 is a flowchart of a sixth example of map data pre-install method.

FIG. 14 shows a flowchart showing the sixth pre-install method. In FIG. 14, first the user sets the reference point (step S51). In this step, the user may set two or more reference points, and the information of the reference point is transmitted to the map server 101 in the map data providing center 6. The map server 101 selects one mesh according to one of the first to fourth methods shown in FIGS. 13A to 13D using the reference points (step S52). Then, the map server 101 determines whether or not the total number of the meshes selected until then has reached the predetermined number (step S53). In this way, the map server 101 continues the selection of the mesh by one of the first to fourth methods shown in FIGS. 13A to 13D, until the meshes of a predetermined number are selected.

Then, when the number of the meshes selected until then reaches the predetermined number (step S53; Yes), the map server 101 obtains the mesh data corresponding to those meshes from the map database 104 and transmits them to the pre-install terminal 102 (step S54). The pre-install terminal 102 receives the map data (step S55), and installs the map data to the navigation apparatus 7 (step S56).

In this example, the pre-install data amount is determined to be the map data amount corresponding to the meshes of a predetermined number. Alternatively, the pre-install data amount may be determined such that the total data amount of the mesh data corresponding to the plural meshes reaches the predetermined data amount, regardless of the number of the meshes. In that case, in step S13, instead of determining whether the number of the selected meshes reaches the predetermined number, it is determined whether or not the total data amount of the mesh data selected until then reaches the predetermined data amount. Other steps are the same as the case in which the pre-install data amount is determined by the number of the meshes.

Next, the description will be given of how the meshes are selected according to the first to fourth methods shown in FIGS. 13A to 13D when the pre-install data amount is limited. This is because, if the pre-install data amount is limited, the meshes cannot be selected to the end according to one of the first to fourth methods.

In the first method shown in FIG. 13A, the first meshes included in the triangle formed by the reference points A to C are selected. Then, if the mesh can be further selected, the meshes are selected to a certain range outside of the triangle. If the pre-install data amount is sufficiently large, all of the area 200 may be set to the pre-install area.

In the second method shown in FIG. 13B, the meshes in a certain range from the respective reference points (e.g., 5 km) are selected to define the separate area 201, and if further meshes can be selected, then the meshes in another certain range (e.g., 10 km) from the respective reference points are selected to enlarge the separate area 201. If still further meshes can be selected, the meshes in still another range (e.g., 15 km) are selected to further enlarge the separate area 20. In this way, as many meshes as possible are selected within the limit of the pre-install data amount.

It is noted that, in the second method, there is another method to set the priority to the reference points A to C and selects the meshes according to the priority. In that case, the user sets the priority of the reference points in step S51 in FIG. 14. For example, if the priority of the reference points are in the order of A, B, C from the highest one, first the meshes are selected from the predetermined range around the reference point A, and then the meshes are selected from the predetermined range around the reference point B if further selection of the meshes is possible, and then the meshes are selected from the predetermined range around the reference point C if still further selection of the meshes is possible. In addition, if there is priority set to the reference points, in the method of enlarging the separate area 201, the separate areas 201 may be enlarged according to the priority order.

In the third method shown in FIG. 13C, first the meshes around the respective reference points are selected, like the second method, and then the meshes within the polygon area formed by connecting the reference points are selected if further meshes can be selected. In that case, by selecting the meshes from the vertices (i.e., reference points) of the polygon to the inner area of the polygon, the mesh data of the area connecting the reference points may be pre-installed with higher priority.

In the fourth method shown in FIG. 13D, first the meshes around the reference points are selected, like the second method, and then the meshes can be selected to form the connecting area 203, connecting the reference points and having a certain width 204, if further meshes can be selected.

7th EMBODIMENT

Next, a seventh embodiment of the pre-install method will be described. In the above-described fifth and sixth embodiments, when only one reference point is set by the user, a certain range of area determined with the reference point at the center is set to the pre-install area. In this embodiment, the pre-install area is determined based on one reference point and a direction designated by the user.

Figure 15A:
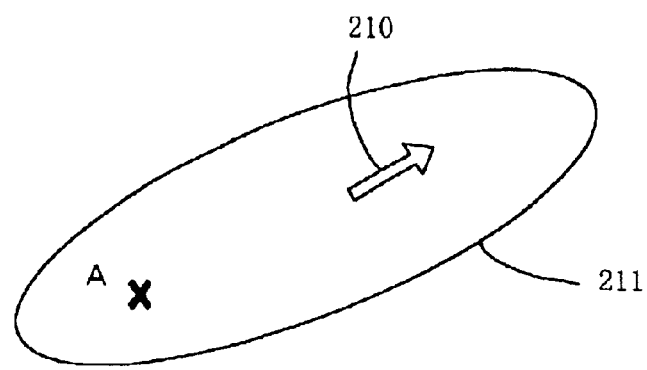
FIG. 15A schematically shows a method of determining a pre-install area according to a seventh example of map data pre-install method.

FIG. 15A schematically shows the manner of determining the pre-install area according to this embodiment. In FIG. 15A, the user sets a direction of area that he or she wants to install the map data, in addition to the reference point A. Specifically, the user designates the reference point and the direction in step S41 of FIG. 12 or step S14 of FIG. 14.

The map server 101 selects the meshes from the reference point designated by the user to the direction designated by the user for a predetermined distance, and sets the selected meshes to the pre-install area. According to this embodiment, if the user's activity area is inclined to a certain direction, the map data necessary for the user can be effectively pre-installed.

It is possible to combine the seventh pre-install method with the fifth or sixth pre-install method. Namely, the fifth or sixth pre-install method is modified to enable the user to designate the direction from the reference point when the user designates the reference point. If the user designates the direction, more meshes in that direction may be selected so that the map data of the user's desired area is pre-installed.

8th EMBODIMENT

Next, the eighth embodiment of the pre-install method will be described. The eighth pre-install method selects the meshes of a certain range of area around the reference point and further selects the meshes including the main road passing near the reference point.

Figure 15B:
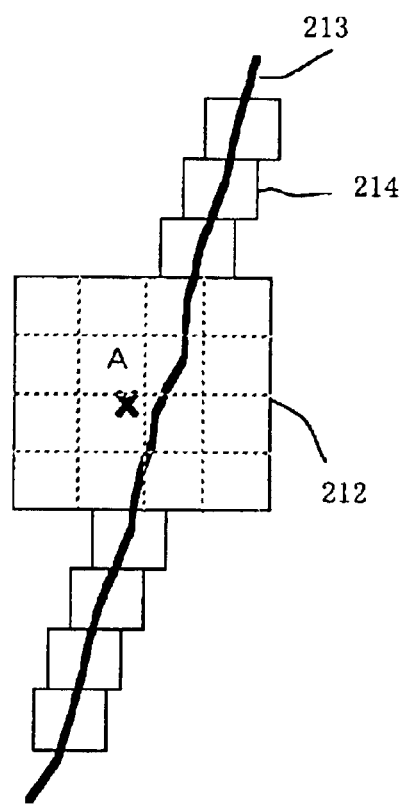
FIG. 15B schematically shows a method of determining a pre-install area according to an eighth example of map data pre-install method.

FIG. 15B schematically shows this method. In FIG. 15B, first the mesh area 212 around the reference point designated by the user are selected. The mesh area 212 is an aggregation of plural meshes. In addition, since the main road 213 passes near the reference point A, the meshes 214 are selected along the main road 213 for a predetermined distance from the reference point A. According to this method, the map data around the main road that passes near the reference point selected by the user can be pre-installed.

It is possible to combine the eighth pre-install method with one of the fifth to seventh pre-install method. Namely, after selecting the meshes of a predetermined range near the respective reference points as shown in FIG. 13B, further meshes may be selected along the main road passing near the respective reference points like the manner shown in FIG. 15B.

Furthermore, in the method shown in FIG. 13D, if there is a main road connecting the reference points, the meshes may be selected along the main road, instead of selecting the meshes along the connecting area 203 connecting the reference points. In a case where the connecting area 203 connecting the reference points A and C straightly as shown in FIG. 13D does not include any main road and a main road connecting the reference points A and C is largely bypassing the connecting area 203, this method can advantageously pre-install the map data along the bypassing main road. It is noted that the main road includes an arterial road, a national road, a toll road, a highway and the like.

Modification

In the first and the second pre-install methods, the map data of predetermined number of meshes are obtained based on the reference point. Alternatively, the number of the mesh data to be obtained may be determined based on the distance from the reference point.

In the water area such as the meshes M45 and M55 in FIG. 4 and the mountain area M11, it is likely that no mesh data is prepared, from the beginning. In that case, since the map database 104 stores the information indicating that no actual mesh data exists for those meshes, the above-mentioned first and second pre-install methods can replace such meshes that do not have actual mesh data in the same manner as the unnecessary meshes and replace them with other meshes.

The above embodiments are directed to the case where the present invention is applied to the vehicle navigation apparatus. However, the application of the present invention is not limited to this, and the present invention is applicable to various communication-type navigation apparatus for moving body such as ships, airplanes, and also applicable to a portable navigation apparatus that people carry with themselves.

As described above, according to the present invention, each user can effectively pre-installs necessary map data. In addition, if the user designates two or more reference points, a preferable pre-install area may be determined in consideration of those plural reference points.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Applications No. 2001-243243, No. 243239 and No. 243251, all filed on Aug. 10, 2001 including the specification, claims, drawings and summary is incorporated herein by reference in its entirety.

What is claimed is:

1. A map data providing apparatus connected with a map data install terminal for a communication-type navigation apparatus via a communication device, comprising:
   a receiving unit which receives a reference point data indicating a reference point from the map data install terminal;
   a map data obtaining unit which obtains map data corresponding to a predetermined number of meshes including no unnecessary mesh based on the reference point data; and
   a transmitting unit which transmits the obtained map data to the map data install terminal.

2. A map data providing apparatus according to claim 1, wherein the map data obtaining unit comprises:
   a selecting unit which selects the predetermined number of meshes based on the reference point data; and
   a replacing unit which detects the unnecessary meshes included in the predetermined number of meshes selected by the selecting unit and replaces the detected meshes with other meshes.

3. A map data providing apparatus according to claim 2, wherein the replacing unit replaces the detected unnecessary mesh with another mesh located opposite, with respect to the reference point, to the detected unnecessary mesh.

4. A map data providing apparatus according to claim 3, wherein the replacing unit replaces the detected unnecessary mesh with another mesh located adjacently to the mesh already selected by the selecting unit.

5. A map data providing apparatus according to claim 2, wherein the replacing unit replaces the another mesh with still another mesh if the another mesh is an unnecessary mesh.

6. A map data providing apparatus according to claim 1, wherein the map data obtaining unit comprises:
   a selecting unit which selects one mesh based on the reference point data;
   a memorizing unit which determines whether or not the one mesh is an unnecessary mesh and memorizes the mesh other than unnecessary mesh; and
   a unit which controls the selecting unit to perform selection and controls the memorizing unit to perform determination until a number of the memorized mesh reaches the predetermined number.

7. A map data providing apparatus according to claim 6, wherein the selecting unit selects the mesh one after another in one of a clockwise direction and a counterclockwise direction with the reference point regarded as a center.

8. A map data providing apparatus according to claim 1, wherein the map data corresponding to each mesh has a data structure including road data and auxiliary data, and wherein the unnecessary mesh is a mesh which does not include road data.

9. A map data providing apparatus according to claim 1, wherein the unnecessary mesh corresponds to a geographical area completely belonging to a mountain area or a water area.

10. A map data providing apparatus according to claim 1, wherein the unnecessary mesh correspondes to a mesh for which no substantial data associated with map is prepared.

11. A map data providing apparatus according to claim 1, wherein the predetermined number is determined based on a storage capacity of a pre-install data storage unit of the communication-type navigation apparatus.

12. A map data providing apparatus according to claim 1, wherein the predetermined number is a number of the meshes belonging to an area within a predetermined distance from the reference point.

13. A map data install terminal which communicates with a map data providing apparatus comprising:
   a receiving unit which receives a reference point data indicating a reference point from the map data install terminal;
   a map data obtaining unit which obtains map data corresponding to a predetermined number of meshes including no unnecessary mesh based on the reference point data; and
   a transmitting unit which transmits the obtained map data to the map data install terminal, the map data install terminal comprises:
   a transmitting unit which transmits the reference data to the map data providing apparatus; and
   a unit which stores the map data received from the map data providing apparatus into a storage medium that can be installed to a navigation apparatus.

14. A map data install terminal which communicates with a map data providing apparatus comprising:
   a receiving unit which receives a reference point data indicating a reference point from the map data install terminal;
   a map data obtaining unit which obtains map data corresponding to a predetermined number of meshes including no unnecessary mesh based on the reference point data; and
   a transmitting unit which transmits the obtained map data to the map data install terminal, the map data install terminal comprises:
   a unit which transmits the reference data to the map data providing apparatus; and
   a unit which stores the map data received from the map data providing apparatus to a navigation apparatus via a communication path.

15. A communication-type navigation apparatus comprising:
   a data storage unit which stores map data;
   a storing unit which stores the map data provided from a map data providing unit into the data storage unit as pre-install map data; and
   a unit which communicates with the map data providing apparatus to obtain map data and stores the map data into the data storage unit, wherein the map data providing unit comprises:
a receiving unit which receives a reference point data indicating a reference point from the map data install terminal;
a map data obtaining unit which obtains map data corresponding to a predetermined number of meshes including no unnecessary mesh based on the reference point data; and
a transmitting unit which transmits the obtained map data to the map data install terminal.

16. A map data providing apparatus connected with a map data install terminal for a communication-type navigation apparatus via a communication device, comprising:
a receiving unit which receives a reference point data indicating a reference point from the map data install terminal;
a map data obtaining unit which obtains map data, that corresponding to a plurality of meshes including no unnecessary mesh and having data amount no more than a predetermined pre-install data amount, based on the reference point data; and
a transmitting unit which transmits the obtained map data to the map data install terminal.

17. A map data providing apparatus according to claim 16, wherein the map data obtaining unit comprises:
a selecting unit which selects the plurality of meshes based on the reference point data; and
a replacing unit which detects the unnecessary meshes included in the plurality of meshes selected by the selecting unit and replaces the detected meshes with other meshes.

18. A map data providing apparatus according to claim 17, wherein the replacing unit replaces the detected unnecessary mesh with another mesh located opposite, with respect to the reference point, to the detected unnecessary mesh.

19. A map data providing apparatus according to claim 18, wherein the replacing unit replaces the detected unnecessary mesh with another mesh located adjacently to the mesh already selected by the selecting unit.

20. A map data providing apparatus according to claim 17, wherein the replacing unit replaces the another mesh with still another mesh if the another mesh is an unnecessary mesh.

21. A map data providing apparatus according to claim 16, wherein the map data obtaining unit comprises:
a selecting unit which selects one mesh based on the reference point data;
a memorizing unit which determines whether or not the one mesh is an unnecessary mesh and memorizes the mesh other than unnecessary mesh; and
a unit which controls the selecting unit to perform selection and controls the memorizing unit to perform determination until a total data amount the memorized mesh reaches the pre-install data amount.

22. A map data providing apparatus according to claim 21, wherein the selecting unit selects the mesh one after another in one of a clockwise direction and a counterclockwise direction with the reference point regarded as a center.

23. A map data providing apparatus according to claim 16, wherein the map data corresponding to each mesh has a data structure including road data and auxiliary data, and wherein the unnecessary mesh is a mesh which does not include road data.

24. A map data providing apparatus according to claim 16, wherein the unnecessary mesh corresponds to a geographical area completely belonging to a mountain area or a water area.

25. A map data providing apparatus according to claim 16, wherein the unnecessary mesh corresponding to a mesh for which no substantial data associated with map is prepared.

26. A map data providing apparatus according to claim 16, wherein the pre-install data amount is determined based on a storage capacity of a pre-install data storage unit of the communication-type navigation apparatus.

27. A map data providing apparatus according to claim 16, wherein the pre-install data amount corresponds to a total data amount of meshes belonging to an area within a predetermined distance from the reference point.

28. A map data install terminal which communicates with a map data providing apparatus comprising:
a receiving unit which receives a reference point data indicating a reference point from the map data install terminal;
a map data obtaining unit which obtains map data, that corresponding to a plurality of meshes including no unnecessary mesh and having data amount no more than a predetermined pre-install data amount, based on the reference point data; and
a transmitting unit which transmits the obtained map data to the map data install terminal, the map data install terminal comprises:
a transmitting unit which transmits the reference data to the map data providing apparatus; and
a unit which stores the map data received from the map data providing apparatus into a storage medium that can be installed to a navigation apparatus.

29. A map data install terminal which communicates with a map data providing apparatus comprising:
a receiving unit which receives a reference point data indicating a reference point from the map data install terminal;
a map data obtaining unit which obtains map data, that corresponding to a plurality of meshes including no unnecessary mesh and having data amount no more than a predetermined pre-install data amount, based on the reference point data; and
a transmitting unit which transmits the obtained map data to the map data install terminal, the map data install terminal comprises:
a unit which transmits the reference data to the map data providing apparatus; and
a unit which stores the map data received from the map data providing apparatus to a navigation apparatus via a communication path.

30. A communication-type navigation apparatus comprising:
a data storage unit which stores map data;
a storing unit which stores the map data provided from a map data providing unit into the data storage unit as pre-install map data; and
a unit which communicates with the map data providing apparatus to obtain map data and stores the map data into the data storage unit, wherein the map data providing unit comprises:
a receiving unit which receives a reference point data indicating a reference point from the map data install terminal;
a map data obtaining unit which obtains map data, that corresponding to a plurality of meshes including no unnecessary mesh and having data amount no more than a predetermined pre-install data amount, based on the reference point data; and a transmitting unit which transmits the obtained map data to the map data install terminal.

31. A map data providing apparatus connected with a map data install terminal for a communication-type navigation apparatus via a communication device, comprising:
- a receiving unit which receives a reference point data indicating a reference point from the map data install terminal;
- an area determining unit which determines a pre-install area based on the reference point data;
- a map data obtaining unit which obtains map data corresponding to the pre-install area; and
- a transmitting unit which transmits the obtained map data to the map data install terminal,
- wherein, when the receiving unit receives a plurality of reference points, the map data obtaining unit determines the pre-install area based on a plurality of reference points.

32. A map data providing apparatus according to claim 31, wherein the area determining unit determines a continuous area of a predetermined range which covers all of the plurality of reference points as the pre-install area.

33. A map data providing apparatus according to claim 31, wherein the area determining unit determines an aggregation of a plurality of separate predetermined ranges, each including the reference point at its center, as the pre-install area.

34. A map data providing apparatus according to claim 32, wherein the predetermined range has a circular or a rectangular shape.

35. A map data providing apparatus according to claim 32, wherein, when the receiving unit receives no less than two reference points, the area determining unit determines the pre-install area to include an area defined inside of a polygon formed by connecting the plurality of reference points.

36. A map data providing apparatus according to claim 33, wherein the area determining unit determines the pre-install area to include a connecting area defined along neighboring two of the reference points and having a predetermined width.

37. A map data providing apparatus according to claim 33, wherein the receiving unit receives a direction data associated with the reference point, and wherein the area determining unit determines the pre-install area to include an area of a predetermined range defined in a direction indicated by the direction data.

38. A map data providing apparatus according to claim 32, wherein the area determining unit determines the pre-install area to include an area of a predetermined range along a main road which passes near the reference points.

39. A map data providing apparatus according to claim 31, wherein the area determining unit comprises:
- a selecting unit which selects meshes constituting the map data; and
- a unit which stops selection of the meshes by the selecting unit when a number of the selected meshes reaches a predetermined number and which determines the pre-install area in accordance with the meshes that has been selected at that time.

40. A map data providing apparatus according to claim 39, wherein the predetermined number is determined based on a storage capacity of a pre-install data storage unit of the communication-type navigation apparatus.

41. A map data providing apparatus according to claim 31, wherein the area determining unit comprises:
- a selecting unit which selects meshes constituting the map data; and
- a unit which stops selection of the meshes by the selecting unit when a total data amount of the selected meshes reaches a predetermined data amount and which determines the pre-install area in accordance with the meshes that has been selected at that time.

42. A map data providing apparatus according to claim 41, wherein the predetermined number is determined based on a storage capacity of a pre-install data storage unit of the communication-type navigation apparatus.

43. A map data install terminal which communicates with a map data providing apparatus comprising:
- a receiving unit which receives a reference point data indicating a reference point from the map data install terminal;
- an area determining unit which determines a pre-install area based on the reference point data;
- a map data obtaining unit which obtains map data corresponding to the pre-install area; and
- a transmitting unit which transmits the obtained map data to the map data install terminal,
- wherein, when the receiving unit receives a plurality of reference points, the map data obtaining unit determines the pre-install area based on a plurality of reference points, the map data install terminal comprises:
- a transmitting unit which transmits the reference data to the map data providing apparatus; and
- a unit which stores the map data received from the map data providing apparatus into a storage medium that can be installed to a navigation apparatus.

44. A map data install terminal which communicates with a map data providing apparatus comprising:
- a receiving unit which receives a reference point data indicating a reference point from the map data install terminal;
- an area determining unit which determines a pre-install area based on the reference point data;
- a map data obtaining unit which obtains map data corresponding to the pre-install area; and
- a transmitting unit which transmits the obtained map data to the map data install terminal,
- wherein, when the receiving unit receives a plurality of reference points, the map data obtaining unit determines the pre-install area based on a plurality of reference points, the map data install terminal comprises:
- a unit which transmits the reference data to the map data providing apparatus; and
- a unit which stores the map data received from the map data providing apparatus to a navigation apparatus via a communication path.

45. A communication-type navigation apparatus comprising:
- a data storage unit which stores map data;
- a storing unit which stores the map data provided from a map data providing unit into the data storage unit as pre-install map data; and
- a unit which communicates with the map data providing apparatus to obtain map data and stores the map data into the data storage unit, wherein the map data providing unit comprises:
- a receiving unit which receives a reference point data indicating a reference point from the map data install terminal;

an area determining unit which determines a pre-install area based on the reference point data;

a map data obtaining unit which obtains map data corresponding to the pre-install area; and a transmitting unit which transmits the obtained map data to the map data install terminal, wherein, when the receiving unit receives a plurality of reference points, the map data obtaining unit determines the pre-install area based on a plurality of reference points.

* * * * *